US012619813B1

(12) United States Patent
Hamann

(10) Patent No.: US 12,619,813 B1
(45) Date of Patent: May 5, 2026

(54) ENCODING AND DECODING TEXT AND DATA AS COLOR GRIDS WITH METADATA FOR EFFICIENT DECODING

(71) Applicant: Louis Cornelius Hamann, Las Vegas, NV (US)

(72) Inventor: Louis Cornelius Hamann, Las Vegas, NV (US)

( * ) Notice: Subject to any disclaimer, the term of this patent is extended or adjusted under 35 U.S.C. 154(b) by 0 days.

(21) Appl. No.: 19/259,720

(22) Filed: Jul. 3, 2025

(51) Int. Cl.
| | |
|---|---|
| *G06F 40/126* | (2020.01) |
| *G06F 40/242* | (2020.01) |
| *G06F 40/284* | (2020.01) |
| *G06F 40/289* | (2020.01) |
| *G06F 40/30* | (2020.01) |
| *G06T 9/00* | (2006.01) |
| *G06T 11/00* | (2006.01) |
| *G06T 11/40* | (2006.01) |
| *G06T 11/60* | (2006.01) |

(52) U.S. Cl.
CPC .......... *G06F 40/126* (2020.01); *G06F 40/242* (2020.01); *G06F 40/284* (2020.01); *G06T 9/00* (2013.01); *G06T 11/001* (2013.01); *G06T 11/60* (2013.01); *G06F 40/289* (2020.01); *G06F 40/30* (2020.01); *G06T 11/40* (2013.01)

(58) Field of Classification Search
None
See application file for complete search history.

(56) References Cited

U.S. PATENT DOCUMENTS

| | | | |
|---|---|---|---|
| 11,087,077 B2 | 8/2021 | Wheaton et al. | |
| 11,606,569 B2 | 3/2023 | Tourapis et al. | |
| 2011/0022953 A1* | 1/2011 | Chiu ...................... | G06F 16/36 |
| | | | 715/259 |
| 2014/0096041 A1* | 4/2014 | Gowen .............. | G06Q 30/0621 |
| | | | 715/753 |
| 2015/0280736 A1* | 10/2015 | Ogasawara ............. | H03M 7/42 |
| | | | 341/51 |
| 2017/0046311 A1* | 2/2017 | Walker .................. | G06F 40/253 |
| | (Continued) | | |

OTHER PUBLICATIONS

Vidya Setlur; Maureen C. Stone; A Linguistic Approach to Categorical Color Assignment for Data Visualization; Aug. 12, 2015; URL: https://ieeexplore.ieee.org/document/7192709?source= IQplus (Year: 2015).*

(Continued)

*Primary Examiner* — Richa Sonifrank

(57) ABSTRACT

Methods, systems, and devices for encoding text and data as color grids with metadata for efficient decoding are described. In some implementations, a server may receive text or structured data and perform tokenizing and lexical analysis of the data for arranging the data into a stream of classified tokens comprising atomic tokens and compounded phrases. The server may assign distinct color values of a color space to these tokens and phrases based on a dynamically generated dictionary, which may map tokens and phrases to corresponding color values. The server may then assemble a color grid by placing the assigned color values into a grid format according to a predefined reading rule. The color grid may be stored as an image file with appended metadata comprising the dynamically generated dictionary for deterministic decoding.

17 Claims, 11 Drawing Sheets
(3 of 11 Drawing Sheet(s) Filed in Color)

(56) References Cited

U.S. PATENT DOCUMENTS

| | | | |
|---|---|---|---|
| 2017/0075877 A1* | 3/2017 | Lepeltier | G06F 40/117 |
| 2018/0121391 A1* | 5/2018 | Beri | G09G 5/377 |
| 2018/0173698 A1* | 6/2018 | Dubey | G06F 16/3347 |
| 2018/0336178 A1* | 11/2018 | Kataoka | G06F 40/242 |
| 2021/0081410 A1* | 3/2021 | Chavan | G06F 9/3888 |
| 2021/0089585 A1* | 3/2021 | Callanta | G06F 40/268 |
| 2022/0138402 A1* | 5/2022 | Kraus | G06F 40/103 |
| | | | 715/269 |
| 2023/0306188 A1* | 9/2023 | Wild | G06F 3/1208 |

OTHER PUBLICATIONS

In Tang, X., Du Y., Lai, A. et al. Deep learning-based solution for smart contract vulnerabilities detection. Scientific Reports vol. 13, Article 20106 (2023).
Matheus Richard Turn Your Code Into Pixel Art. Thoughtbot Blog, Jan. 2, 2024.

* cited by examiner

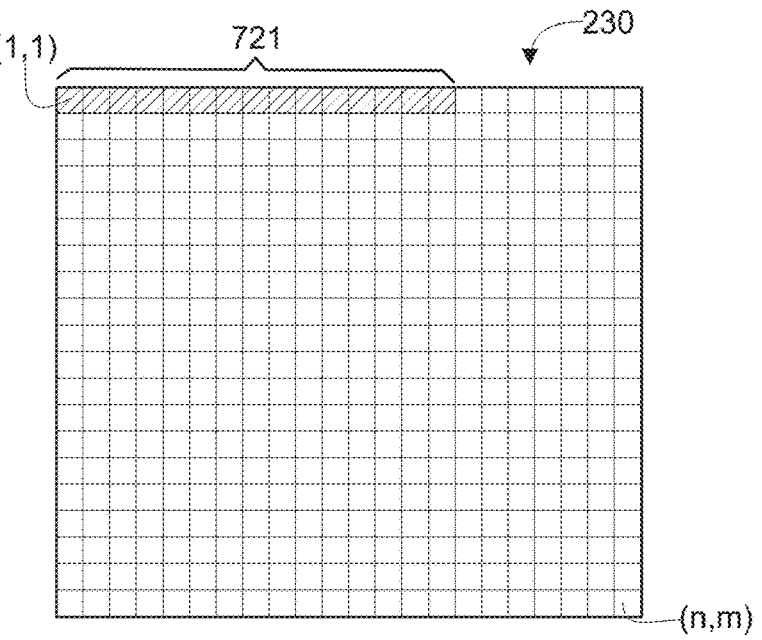
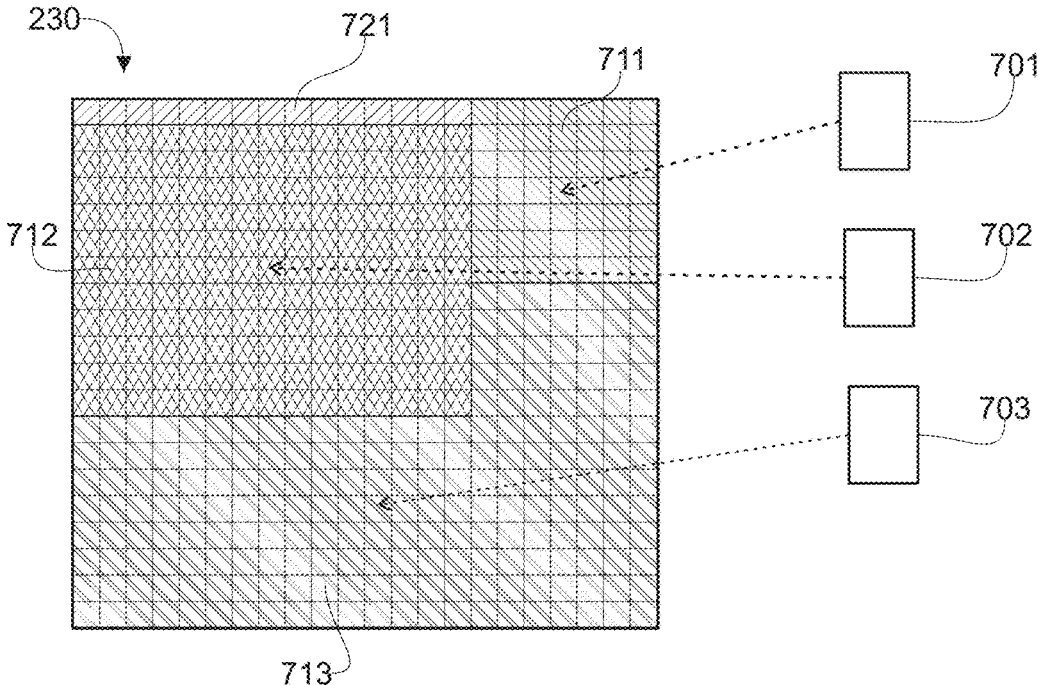
FIG. 7

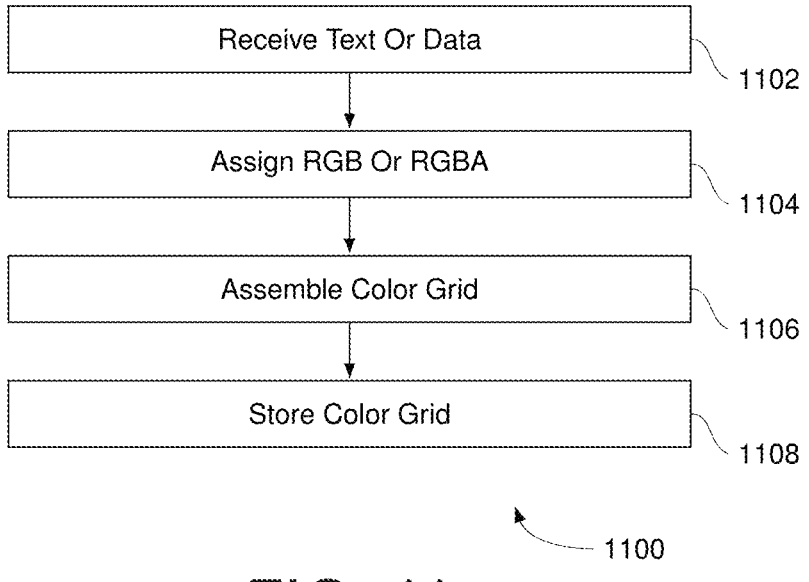

```
┌─────────────────────────────────┐
│        Receive Text Or Data      │
└─────────────────────────────────┘  ╲ 1102
                │
                ▼
┌─────────────────────────────────┐
│        Assign RGB Or RGBA        │
└─────────────────────────────────┘  ╲ 1104
                │
                ▼
┌─────────────────────────────────┐
│        Assemble Color Grid       │
└─────────────────────────────────┘  ╲ 1106
                │
                ▼
┌─────────────────────────────────┐
│         Store Color Grid         │
└─────────────────────────────────┘  ╲ 1108
```

```
┌─────────────────────────────────┐
│         Receive Image File       │
└─────────────────────────────────┘  ╲ 1202
                │
                ▼
┌─────────────────────────────────┐
│          Extract Metadata        │
└─────────────────────────────────┘  ╲ 1204
                │
                ▼
┌─────────────────────────────────┐
│     Interpret Reconstructed Data │
└─────────────────────────────────┘  ╲ 1206
                │
                ▼
┌─────────────────────────────────┐
│      Output Reconstructed Data   │
└─────────────────────────────────┘  ╲ 1208
```

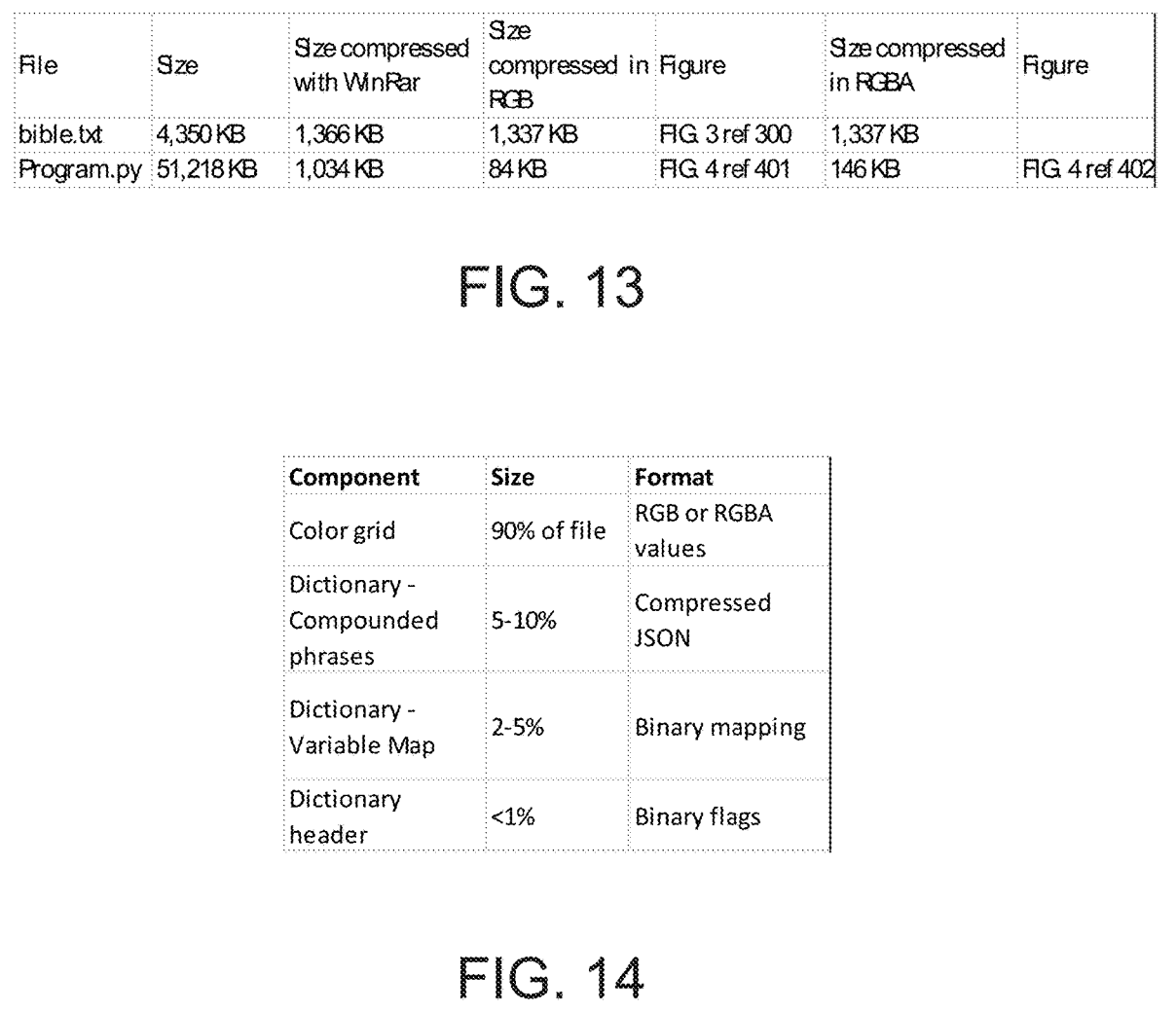

| File | Size | Size compressed with WinRar | Size compressed in RGB | Figure | Size compressed in RGBA | Figure |
|---|---|---|---|---|---|---|
| bible.txt | 4,350 KB | 1,366 KB | 1,337 KB | FIG. 3 ref 300 | 1,337 KB | |
| Program.py | 51,218 KB | 1,034 KB | 84 KB | FIG. 4 ref 401 | 146 KB | FIG. 4 ref 402 |

FIG. 13

| Component | Size | Format |
|---|---|---|
| Color grid | 90% of file | RGB or RGBA values |
| Dictionary - Compounded phrases | 5-10% | Compressed JSON |
| Dictionary - Variable Map | 2-5% | Binary mapping |
| Dictionary header | <1% | Binary flags |

FIG. 14

ENCODING AND DECODING TEXT AND DATA AS COLOR GRIDS WITH METADATA FOR EFFICIENT DECODING

FIELD OF TECHNOLOGY

The present disclosure relates generally to database systems and data processing, and more specifically to encoding text and data as color grids with metadata for efficient decoding.

BACKGROUND

Efficient storage and transmission of text and structured data are critical in the field of computing. Encoding schemes such as the American Standard Code for Information Interchange and Unicode may represent characters as binary data, enabling digital systems to process and store textual information. Compression algorithms may be employed to reduce file sizes, optimizing storage and transmission. Image-based encoding techniques may also be used to embed information into visual formats, leveraging the ability of images to represent complex data structures compactly.

Attempts have been made to convert data, such as a program file, in color grids, however, the decoding was either not considered or appeared to contain unacceptable decoding errors.

SUMMARY

The described techniques relate to improved methods, systems, devices, and apparatuses for encoding text and data as color grids with metadata for efficient decoding. Some implementations may provide a method for encoding text and structured data as color grids, leveraging a dynamically generated dictionary that maps words, phrases, or tokens to distinct color values in a color space such as Red-Green-Blue (RGB) or Red-Green-Blue-Alpha (RGBA) values. The encoded data may be stored as an image file, with the dictionary appended as metadata which may be in a human-readable format, such as JavaScript Object Notation (JSON). This approach may ensure deterministic decoding, as the dictionary may provide a one-to-one mapping between colors and their corresponding data elements. The method may support both static and dynamically generated dictionaries, enabling efficient encoding of diverse datasets, including text, programming code, and structured data.

The encoded image may be processed using both central processing units, graphics processing units or dedicated hardware, significantly accelerating decoding and execution. The method may also support additional features, such as the use of the alpha channel in RGBA to encode contextual or semantic information, ensuring that the encoded data retains its original structure and meaning. The compact nature of the color grid may allow for substantial reductions in storage size, while the appended dictionary may ensure that each encoded file is self-contained and secure. This innovation may address the limitations of existing methods, offering a scalable, efficient, and versatile solution for data encoding and transmission across a wide range of applications.

A method for encoding text and data as color grids with metadata for efficient decoding is described. The method may include receiving text or structured data and performing tokenizing and lexical analysis of the text or structured data for arranging the text or structured data into a stream of classified tokens comprising atomic tokens and compounded phrases. assigning distinct color values in a color space to atomic tokens and compounded phrases based on a dynamically generated dictionary, the dictionary mapping classified tokens and compounded phrases to corresponding distinct color values. The method may include assembling a color grid by placing assigned distinct color values into a grid format according to a predefined reading rule and generating metadata comprising the dynamically generated dictionary. The method may include storing the color grid as an image file with appended metadata comprising the dynamically generated dictionary for deterministic decoding of text or structured data.

A system configured for encoding text and data as color grids with metadata for efficient decoding the system comprising an encoding platform and a decoding platform is described. The encoding platform may include a processor and memory coupled with the processor. The system may include instructions stored in the memory and executable by the processor to cause the system to receive text or structured data and perform tokenizing and lexical analysis of the text or structured data for arranging the text or structured data into a stream of classified tokens comprising atomic tokens and compounded phrases. The system may assign distinct color values in a color space to atomic tokens and compounded phrases based on a dynamically generated dictionary, the dictionary mapping classified tokens and compounded phrases to corresponding distinct color values. The system may assemble a color grid by placing assigned distinct color values into a grid format according to a predefined reading rule and generate metadata comprising the dynamically generated dictionary. The system may store the color grid as an image file with appended metadata comprising the dynamically generated dictionary for deterministic decoding of text or structured data.

Another system for encoding text and data as color grids with metadata for efficient decoding and transmission is described. The system may include means for receiving text or structured data and performing tokenizing and lexical analysis of the text or structured data for arranging the text or structured data into a stream of classified tokens comprising atomic tokens and compounded phrases. The system may include means for assigning distinct color values in a color space to atomic tokens and compounded phrases based on a dynamically generated dictionary, the dictionary mapping classified tokens and compounded phrases to corresponding distinct color values. The system may include means for assembling a color grid by placing assigned distinct color values into a grid format according to a predefined reading rule and means for generating metadata comprising the dynamically generated dictionary. The system may include means for storing the color grid as an image file with appended metadata comprising the dynamically generated dictionary for deterministic decoding of text or structured data.

A non-transitory computer-readable medium storing code for encoding text and data as color grids with metadata for efficient decoding is described. The code may include instructions executable by a processor to receive text or structured data and performing tokenizing and lexical analysis of the text or structured data for arranging the text or structured data into a stream of classified tokens comprising atomic tokens and compounded phrases. The code may include instructions executable by a processor to assign distinct color values in a color space to atomic tokens and compounded phrases based on a dynamically generated dictionary, the dictionary mapping classified tokens and compounded phrases to corresponding distinct color values.

The code may include instructions executable by a processor to assemble a color grid by placing assigned distinct color values into a grid format according to a predefined reading rule and generating metadata comprising the dynamically generated dictionary. The code may include instructions executable by a processor to store the color grid as an image file with appended metadata comprising the dynamically generated dictionary for deterministic decoding of text or structured data.

BRIEF DESCRIPTION OF THE DRAWINGS

The present application file contains at least one drawing executed in color. Copies of this patent or patent application publication with color drawing(s) will be provided by the Office upon request and payment of the necessary fee.

FIG. 7 illustrates a coded color grid comprising a part of the color grid where specific areas of the color grid are associated with different files or different information such as a reading rule in accordance with various aspects of the present disclosure.

FIG. 11 shows a flowchart illustrating a method for encoding text and data as color grids with metadata for efficient decoding in accordance with various aspects of the present disclosure.

FIG. 12 shows a flowchart illustrating a method for encoding text and data as color grids with metadata for efficient decoding in accordance with various aspects of the present disclosure.

FIG. 13 shows a comparison table of compression ratio obtained with a common compression software and a file encoded in accordance with various aspects of the present disclosure.

FIG. 14 illustrates an average breakdown of a size of an image file with appended metadata encoded in accordance with various aspects of the present disclosure.

DETAILED DESCRIPTION

Figure 1:
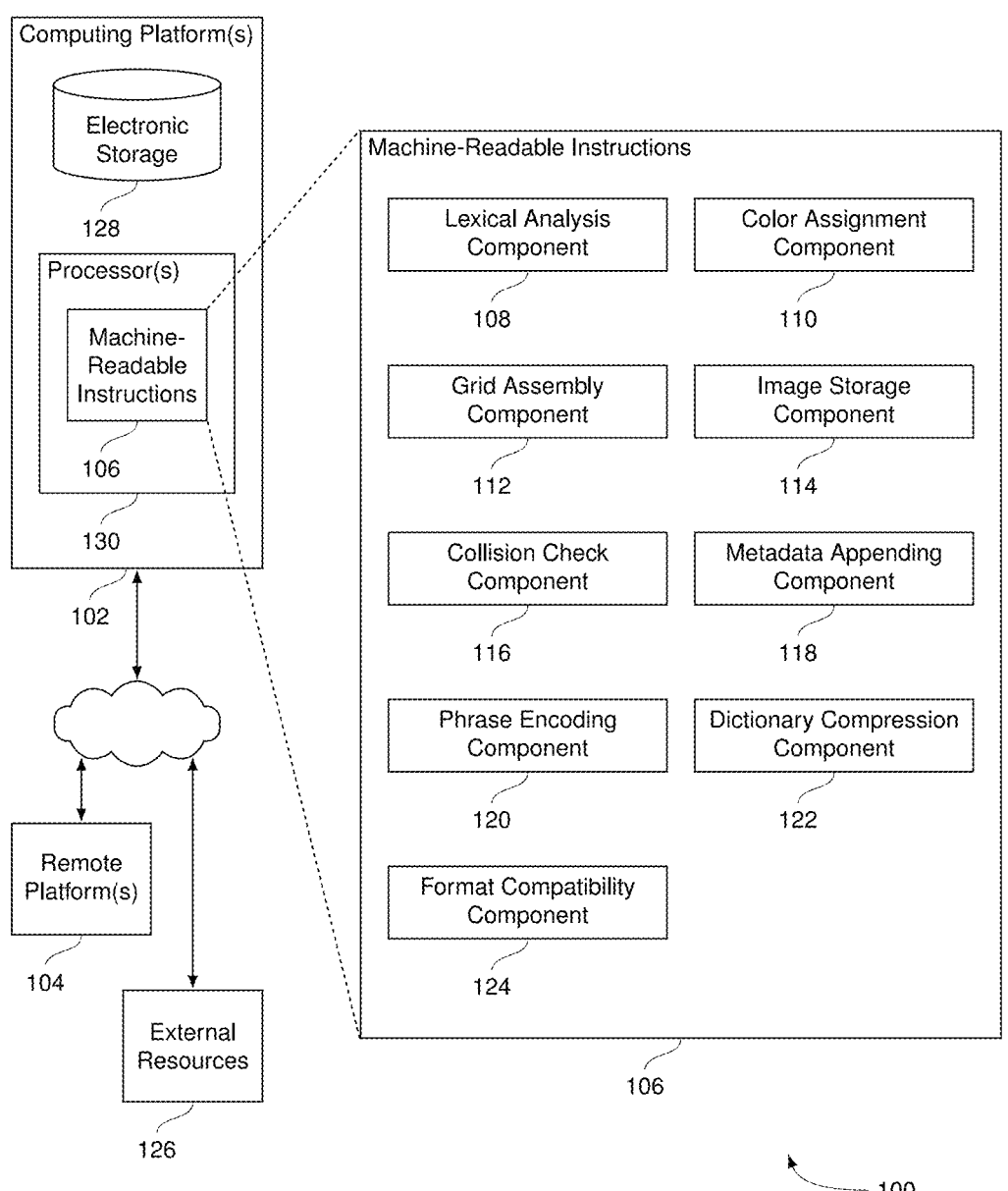
FIG. 1 illustrates an example of a system for information processing configured for encoding text and data as color grids with metadata for efficient decoding in accordance with aspects of the present disclosure.

Methods, systems, devices, and apparatuses for encoding text and data as color grids with metadata for efficient decoding are disclosed. In some examples, existing methods for encoding text and structured data may face significant limitations in terms of efficiency, scalability, and versatility. Text-based encoding schemes, such as those using character encoding standards, may require substantial storage space, particularly for large datasets or complex programming code. While compression algorithms may reduce file sizes, they often rely on computationally intensive processes and may not be optimized for modern hardware, such as graphics processing units. Image-based encoding techniques, though promising, frequently may lack deterministic decoding mechanisms, making them unsuitable for applications requiring precise data reconstruction. Furthermore, these methods may often fail to preserve the semantic and syntactic structure of the original data, limiting their utility in fields such as programming, decentralized computing, and artificial intelligence. The inability to efficiently encode and decode data in a compact, hardware-optimized format may present a barrier to advancements in decentralized computing, on-chain storage, and high-performance data processing.

According to some implementations, a method may encode text and structured data into grids of colors, where each word, phrase, or token may be represented by a distinct color value in a color space. This process may involve creating a dictionary that maps these text elements to specific color values, which may be in the form of red, green, and blue values, or red, green, blue, and alpha values. The encoded data may be stored as an image file, such as a portable network graphics file, which may include the color grid and metadata containing the dictionary for decoding.

The disclosure herein uses examples where the color values are coded in a RGB, sRGB or RGBA color space, however the method may be adapted to be implemented with other color spaces.

The dictionary may be generated dynamically during the encoding process, mapping words, phrases, or tokens to specific color values. It may be static, predefined for a language, or dynamically generated based on the specific text being encoded. For dynamically generated dictionaries, only the words, phrases, or tokens present in the text may be included, reducing the dictionary size. This dictionary may be appended to the image file as metadata, enabling deterministic decoding of the encoded data. It may be stored in a human-readable format, such as a structured data format, and may include mappings for individual words, phrases, variables, and other tokens.

Each word, phrase, or token may be assigned a unique color value. The red, green, and blue encoding may use three bytes per color, while the red, green, blue, and alpha encoding may add an additional channel for further differentiation. The alpha channel may be used to distinguish between different types of tokens, such as keywords, operators, variables, or strings. The method may ensure that selected colors are distinct enough from one another to avoid confusion during decoding, using methods to measure color distance.

The encoded color grid may provide significant compression compared to traditional text storage formats. For example, a page of text encoded as a color grid may require less storage space than the same text stored in a standard text format. The compression ratio may range from 50 to 500 times smaller than the original text or structured data, depending on the type of content being encoded. The encoded image file may be further compressed using standard image compression methods.

The method may support encoding structured data, such as programming source code, legal agreements, or other repetitive and formulaic texts. For programming source code, keywords, operators, variables, and phrases may be tokenized and assigned specific colors based on their roles and relationships. Common patterns, such as phrases formed by operators and their operands, may be detected and assigned unique colors during encoding. The encoding process may preserve the syntax and semantics of the structured data, ensuring that it may be decoded and executed deterministically.

The encoding process may involve several steps, including lexical analysis to tokenize the text or structured data into individual elements, syntax analysis to identify the roles and relationships of tokens, phrase detection to identify common patterns or phrases, and mapping of atomic tokens to predefined colors and compounded phrases to dynamically generated colors. A collision check may ensure that selected colors are distinct enough to avoid confusion during decoding. The color grid may be assembled based on the encoded data and reading rules, and the dictionary may be appended to the image file as metadata, including reading rules and token mappings.

The decoding process may involve extracting the dictionary from the metadata of the image file and reconstructing the original text or structured data. The dictionary may provide mappings for each color in the grid, enabling deterministic decoding of the encoded data. The decoding process may be efficient and may leverage both the central processing unit and graphics processing unit for rapid execution. The position of each pixel in the image grid may be known, allowing the entire image to be read at once without individually processing each pixel.

The method may be designed to take advantage of hardware capabilities, such as graphics processing units, for efficient processing of the encoded data. Graphics processing units may excel at image operations, enabling faster decoding of color grids compared to traditional text-based compression methods. Future hardware, such as field-programmable gate arrays or application-specific integrated circuits, may be optimized for decoding color instructions at high speeds.

The encoded color grid may be printed on paper or photographed on film, enabling storage and transmission of the data. The printed image may include grayscale versions of the red, green, and blue or red, green, blue, and alpha channels to facilitate scanning and reconstruction of the original color grid. A calibration grayscale may be included in the printed image to ensure accurate scanning and decoding. The scanned or photographed image may be deciphered using a dictionary that may be supplied as an electronic file or even printed on paper as well, enabling retrieval of the original text or structured data.

Each encoded image file may include a unique dictionary, ensuring that the encoded data may only be deciphered with the corresponding dictionary. The dictionary may be encrypted or transmitted separately from the image file, providing an additional layer of security. The encoded data and dictionary may be interdependent, meaning that neither may provide meaningful information without the other.

Some implementations may find applications in various fields, such as blockchain and decentralized computing, where they may enable efficient storage and transmission of data, such as smart contracts or non-fungible tokens, on decentralized platforms. The encoded color grids may store images, generative code, or interactive logic for non-fungible tokens, enabling self-contained tokens that may not rely on external storage. In decentralized finance, the method may reduce the size and cost of deploying and executing smart contracts, enabling more complex logic on-chain with lower transaction fees. In artificial intelligence, neural network weights and operations may be mapped to color grids, enabling faster execution of inference on graphics processing units or specialized hardware. The method may provide a way to compress and store large volumes of text or structured data in a compact format.

The encoded data may be designed to be decoded deterministically, ensuring that the original text or structured data may be reconstructed exactly as it was before encoding. The dictionary may preserve token boundaries, original spacing, and operator types, maintaining the context and semantics of the encoded data.

The metadata appended to the image file may include a phrase dictionary that maps compounded phrases to their corresponding colors, a variable map that maps variables and literals to their corresponding colors, header information that includes version, language, and settings for decoding, and reading rules that define the line-column position of each pixel in the grid for decoding.

The method may use color algebra to assign colors to compounded phrases, mixing the colors of individual tokens while preserving semantic information. The alpha channel in red, green, blue, and alpha encoding may provide additional differentiation for compounded phrases, ensuring that their context may not be lost.

The method may include a collision check to ensure that selected colors are distinct enough from one another, avoiding confusion during decoding. The collision check may use methods to measure color distance, ensuring that colors are remote enough in the palette.

The encoded data may be processed efficiently, leveraging both central processing unit and graphics processing unit capabilities for encoding and decoding. The decoding process may read the entire image file at once, enabling rapid reconstruction of the original text or structured data.

The encoded data may be stored in a compact file format, such as a portable network graphics file, which may include the color grid and appended metadata. The compact file format may enable efficient storage and transmission of large volumes of data.

The method may support encoding various types of data, including text, programming source code, legal agreements, and other structured data. The encoded data may be stored electronically, transmitted over networks, or printed on media.

The method may be scalable, enabling encoding and decoding of large volumes of data, such as entire books, programming source code, or blockchain transactions. The compression efficiency may increase with the size and complexity of the data being encoded.

The dictionary appended to the image file may be stored in a human-readable format, such as a structured data format, enabling easy inspection and debugging. The metadata may include detailed mappings for each color in the grid, ensuring deterministic decoding of the encoded data.

Aspects of the subject matter described in this disclosure can be implemented to realize one or more of the following potential advantages. The described techniques may be implemented to support efficient data compression and storage by leveraging color-based encoding methods that may reduce file sizes while preserving the integrity of the original information. The encoding process may enable deterministic reconstruction of data, ensuring that encoded text or structured data may be accurately retrieved without loss of context or semantics. The use of dynamically generated dictionaries may optimize the encoding process by limiting the dictionary size to only the elements present in the data, which may improve storage efficiency and decoding speed. The integration of metadata within the encoded file may provide a self-contained mechanism for decoding, which may enhance security by requiring both the encoded image and its corresponding dictionary for interpretation. The method may facilitate the transmission of complex data across various media, including electronic networks and physical print, while maintaining compatibility with scanning and reconstruction processes. The described approach may support diverse applications, such as compressing repetitive or formulaic texts, encoding structured data for decentralized systems, and enabling hardware-accelerated processing for rapid execution of encoded instructions.

Aspects of the disclosure are initially described in the context of networked computing systems. Aspects of the disclosure are additionally illustrated by and described with reference to example implementations. Aspects of the disclosure are further illustrated by and described with reference to apparatus diagrams, system diagrams, and flowcharts that relate to encoding text and data as color grids with metadata for efficient decoding.

FIG. 1 illustrates an example of a system 100 for information processing configured for encoding text and data as color grids with metadata for efficient decoding in accordance with aspects of the present disclosure. For example, the system 100 may be configured for dynamically displaying information based on a context associated with a smart card, in accordance with one or more implementations. In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platforms via computing platform(s) 102 and/ or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction components. The instruction components may include computer program components. The instruction components may include one or more of a lexical analysis component 108, a color assignment component 110, a grid assembly component 112, an image storage component 114, a collision check component 116, a metadata appending component 118, a phrase encoding component 120, a dictionary compression component 122, a format compatibility component 124 and/or other instruction components.

The lexical analysis component 108 may be configured as or otherwise support a means for receiving text or structured data at a server and may perform lexical analysis to tokenize the data into atomic tokens and compounded phrases. In some implementations, the lexical analysis component 108 may receive text files containing programming instructions and may identify keywords such as "if" or "print" for further processing. The lexical analysis component 108 may determine operators like ">" or "+" within the text and may classify them as distinct tokens for subsequent operations. The lexical analysis component 108 may process variables such as "x" or "y" and may assign them specific identifiers for inclusion in a token stream. The lexical analysis component 108 may detect strings such as "Hello" or "World" and may categorize them as separate tokens for encoding. The lexical analysis component 108 may analyze structured data formats like JSON or XML and may extract relevant elements for tokenization.

The color assignment component 110 may be configured as or otherwise support a means for assigning distinct RGB or RGBA values to atomic tokens and compounded phrases based on a dynamically generated dictionary, the dictionary mapping tokens and phrases to corresponding color values. In some implementations, the color assignment component 110 may determine RGB values for keywords like "if" or "print" by referencing a predefined color palette. The color assignment component 110 may assign RGBA values to operators such as ">" or "+" to differentiate them from other tokens. In some implementations, the color assignment component 110 may use a color space like sRGB to ensure that the assigned colors are consistent across different devices. The color assignment component 110 may handle compounded phrases by assigning a unique color that represents the entire phrase, which may involve mixing colors of individual tokens. In some implementations, the color assignment component 110 may perform a collision check to ensure that the assigned colors are distinct enough to avoid confusion during decoding.

The grid assembly component 112 may be configured as or otherwise support a means for assembling a color grid by placing assigned color values into a grid format according to predefined reading rules, the grid may include metadata comprising the dynamically generated dictionary. In some implementations, the grid assembly component 112 may determine the position of each color value in the grid based on a line-column structure defined by the reading rules. The grid assembly component 112 may arrange the colors in a sequential order that corresponds to the tokenized text or data stream. In some implementations, the grid assembly component 112 may adjust the size of the grid to accommodate the total number of tokens or phrases being encoded. The grid assembly component 112 may incorporate markers or reference points into the grid to assist with decoding processes. In some implementations, the grid assembly component 112 may embed additional metadata, such as reading direction or grid dimensions, to support accurate reconstruction of the original data.

The image storage component 114 may be configured as or otherwise support a means for storing the color grid as an image file with metadata that may be appended for deterministic decoding of text or structured data. In some implementations, the image storage component 114 may store the image file in formats supporting metadata such as PNG, JPEG or SVG which may be compatible with various devices and software. The image storage component 114 may include metadata in the form of JSON, EXIF, XML or any other suitable format, which may contain the dictionary mapping colors to tokens for accurate reconstruction. In some implementations, the image storage component 114 may ensure that the metadata is embedded within the image file, allowing for seamless access during decoding processes. The image storage component 114 may support the storage of grayscale images corresponding to individual color channels, which may assist in calibration during optical scanning or photographing. In some implementations, the image storage component 114 may facilitate the storage of the image file on different media, such as digital storage devices or printed paper, which may be scanned or photographed for retrieval.

In some examples, the collision check component 116 may be configured as or otherwise support a means for performing a collision check to ensure that assigned RGB or RGBA values for atomic tokens and compounded phrases may be sufficiently distinct from one another based on a predefined color distance threshold to prevent decoding errors during reconstruction of the text or structured data. In some implementations, the collision check component 116 may determine the distance between colors by comparing their RGB values using a mathematical formula that evaluates the difference between corresponding red, green, and blue channels. In some implementations, the collision check component 116 may apply a condition that requires the difference between any two colors to exceed a specific numerical threshold, to reduce the likelihood of confusion during decoding. In some implementations, the collision check component 116 may incorporate additional parameters, such as luminance or chromaticity, to refine the assessment of color distinctiveness. In some implementations, the collision check component 116 may evaluate the suitability of assigned colors by simulating potential decoding scenarios to identify combinations that may lead to errors.

In some examples, the metadata appending component 118 may be configured as or otherwise support a means for appending metadata to the image file that includes a reading rule specifying the positional arrangement of color values within the color grid to facilitate deterministic decoding of the text or structured data. In some implementations, the metadata appending component 118 may include instructions for reading the grid in a specific direction, such as left-to-right or top-to-bottom, to reconstruct the original sequence of tokens. In some implementations, the metadata appending component 118 may specify grid dimensions, such as the number of rows and columns, to assist in interpreting the positional arrangement of colors. In some embodiment the metadata appending component my include a positional arrangement of color values in the color grid where color values may read, decoded and interpreted to provide a complex reading rule.

In some implementations, the metadata appending component 118 may define markers within the metadata to ensure accurate alignment of the grid during decoding. In some implementations, the metadata appending component 118 may include a reference to the color space, such as sRGB, to standardize the interpretation of RGB or RGBA values across devices. In some implementations, the metadata appending component 118 may append a list of reserved colors within the metadata to prevent conflicts during decoding processes.

In some examples, the phrase encoding component 120 may be configured as or otherwise support a means for encoding compounded phrases by blending color values of individual tokens within the phrases to generate unique color values that may be mapped to the dynamically generated dictionary. In some implementations, the phrase encoding component 120 may determine the RGB values by analyzing the frequency of token combinations within the text. The phrase encoding component 120 may use a predefined color palette to assign initial colors to individual tokens before blending. In some implementations, the phrase encoding component 120 may incorporate a weighting system to prioritize certain tokens during the blending process, which may influence the resulting color value. The phrase encoding component 120 may handle phrases of varying lengths by adjusting the blending algorithm to accommodate the number of tokens involved. In some implementations, the phrase encoding component 120 may perform a check to ensure that the blended color values are distinct enough from other encoded phrases to prevent confusion during decoding.

In some examples, the dictionary compression component 122 may be configured as or otherwise support a means for generating the dynamically created dictionary in a compressed format that may include mappings color values to tokens and phrases, as well as metadata specifying language settings and syntax rules for decoding. In some implementations, the dictionary compression component 122 may determine mappings by analyzing token frequency within the text to prioritize commonly used tokens. In some implementations, the dictionary compression component 122 may include metadata specifying reserved colors to prevent conflicts during decoding. In some implementations, the dictionary compression component 122 may compress the dictionary by grouping similar tokens into categories and assigning shared color values to reduce file size.

In some examples, the format compatibility component 124 may be configured as or otherwise support a means for storing the image file in a format that may support metadata embedding, including formats that may be compatible with both electronic transmission and physical printing for subsequent optical scanning or photographing to retrieve the encoded text or structured data. In some implementations, the format compatibility component 124 may store the image file in a PNG format, which may allow for lossless compression and metadata embedding. In some implementations, the format compatibility component 124 may support the use of JPEG format, which may reduce file size while maintaining compatibility with metadata storage. In some implementations, the format compatibility component 124 may determine the suitability of formats based on their ability to preserve color fidelity during optical scanning or photographing. In some implementations, the format compatibility component 124 may include grayscale channel options to assist with calibration during physical scanning processes. In some implementations, the format compatibility component 124 may support formats that may include embedded dictionaries for decoding structured data directly from the image file.

In some implementations, computing platform(s) 102, remote platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 126 may be operatively linked via some other communication media.

A given remote platform may include one or more processors configured to execute computer program components. The computer program components may be configured to enable an expert or user associated with the given remote platform to interface with system 100 and/or external resources 126, and/or provide other functionality attributed herein to remote platform(s) 104. By way of non-limiting example, a given remote platform and/or a given computing platform may include one or more of a smart card, a server, a desktop computer, a laptop computer, a handheld computer, a tablet computing platform, a NetBook, a Smartphone, a gaming console, and/or other computing platforms. In some implementations, the computing platform(s) 102 may comprise server(s), and the remote platform(s) 104 may comprise remotely located client computing platform(s).

External resources 126 may include sources of information outside of system 100, external entities participating with system 100, and/or other resources. In some implementations, some or all of the functionality attributed herein to external resources 126 may be provided by resources included in system 100.

Computing platform(s) 102 may include electronic storage 128, one or more processors 130, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 128 may comprise non-transitory storage media that electronically stores information. The electronic storage media of electronic storage 128 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from computing platform(s) 102, information received from remote platform(s) 104, and/or other information that enables computing platform(s) 102 to function as described herein.

Processor(s) 130 may be configured to provide information processing capabilities in computing platform(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units.

These processing units may be physically located within the same device, or processor(s) 130 may represent processing functionality of a plurality of devices operating in coordination. Processor(s) 130 may be configured to execute components 108, 110, 112, 114, 116, 118, 120, 122, 124, and/or other components.

Processor(s) 130 may be configured to execute components 108, 110, 112, 114, 116, 118, 120, 122, 124, and/or other components by software; hardware; firmware; some combination of software, hardware, and/or firmware; and/or other mechanisms for configuring processing capabilities on processor(s) 130. As used herein, the term "component" may refer to any component or set of components that performs the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, and/or 124 are illustrated in FIG. 1 as being implemented within a single processing unit, in implementations in which processor(s) 130 includes multiple processing units, one or more of components 108, 110, 112, 114, 116, 118, 120, 122, and/or 124 may be implemented remotely from the other components. The description of the functionality provided by the different components 108, 110, 112, 114, 116, 118, 120, 122, and/or 124 described below is for illustrative purposes, and is not intended to be limiting, as any of components 108, 110, 112, 114, 116, 118, 120, 122, and/or 124 may provide more or less functionality than is described. For example, one or more of components 108, 110, 112, 114, 116, 118, 120, 122, and/or 124 may be eliminated, and some or all of its functionality may be provided by other ones of components 108, 110, 112, 114, 116, 118, 120, 122, and/or 124. As another example, processor(s) 130 may be configured to execute one or more additional components that may perform some or all of the functionality attributed below to one of components 108, 110, 112, 114, 116, 118, 120, 122, and/or 124.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
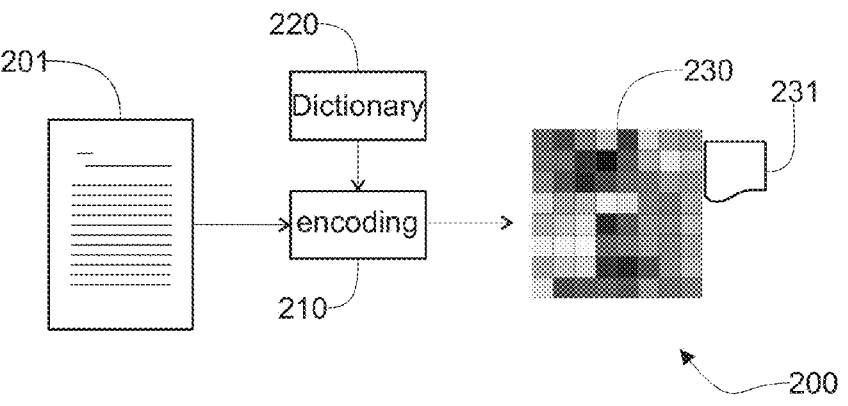
FIG. 2 shows color grid encoding which supports techniques for encoding text and data as color grids with metadata for efficient decoding in accordance with various aspects of the present disclosure.

FIG. 2 shows color grid encoding 200 which supports techniques for encoding text and data as color grids with metadata for efficient decoding in accordance with various aspects of the present disclosure. As depicted in FIG. 2, the color grid encoding 200 may be used to encode one or more of a text 201, with an encoder 210 on the basis of a dictionary 220, to generate color grid 230, and/or other components.

The text 201 may represent the original content intended for encoding into a color grid format. The text 201 may include sequences of words, phrases, or sentences that may be stored in ASCII format, where each character may correspond to a byte. The text 201 may be processed to determine its structure, such as identifying individual words or recurring patterns. The dictionary 220 may map words to specific colors for encoding purposes. In some implementations, the text 201 may include examples like legal agreements, programming source code, or literary works, which may exhibit varying levels of complexity and vocabulary.

The dictionary 220 may include a mapping of words to specific colors, facilitating the conversion of text into a color grid. The dictionary 220 may store associations between individual words or phrases and their corresponding color values. The dictionary 220 may be dynamically generated during the encoding process, containing mappings for words or phrases specific to the text 201. The dictionary 220 may interact with the encoder 210 which may reference the dictionary 220 to assign colors to words or phrases. In some implementations, the dictionary 220 may be stored as metadata 231 within the image file or transmitted separately, and it may include formats such as JSON for human readability.

The encoder 210 may process the text 201 by referencing the dictionary 220 to generate a corresponding color grid 230. The encoder 210 may analyze the text 201 to tokenize its content, identifying individual words, phrases, or patterns. The encoder 210 may assign colors to tokens based on the mappings provided in the dictionary 220, creating a visual representation of the text. The encoder 210 may relate to the color grid 230, which may visually encode the processed text as colored squares. In some implementations, the encoder 210 may perform additional operations, such as collision checks to ensure color differentiation or appending the dictionary 220 as metadata 231 to the image file.

The color grid 230 may visually encode the processed text as a series of colored squares, each representing a word or phrase from the original text. The color grid 230 may consist of a structured arrangement of pixels, where each pixel may correspond to a specific color assigned by the encoder 210. The color grid 230 may be stored as an image file, such as a PNG, which may include metadata 231 containing the dictionary 220 for decoding purposes. The color grid 230 may relate to the text 201, as it represents the encoded version of the original content. In some implementations, the color grid 230 may be printed on paper or transmitted electronically.

In some implementations, the text 201 may be analyzed and tokenized by the encoder 210, which may determine unique color values for each token, or group of tokens, based on the dictionary 220 The dictionary 220 may be dynamically generated during the encoding process, mapping individual words, phrases, or programming instructions to distinct color values. The encoder 210 may then transform the tokenized text into a compact visual representation, creating a color grid 230 where each square corresponds to a token or group of tokens from the original text. The color grid 230 may be stored as an image file with appended metadata 231, including the dictionary 220, to ensure deterministic reconstruction of the original data.

Figure 3:
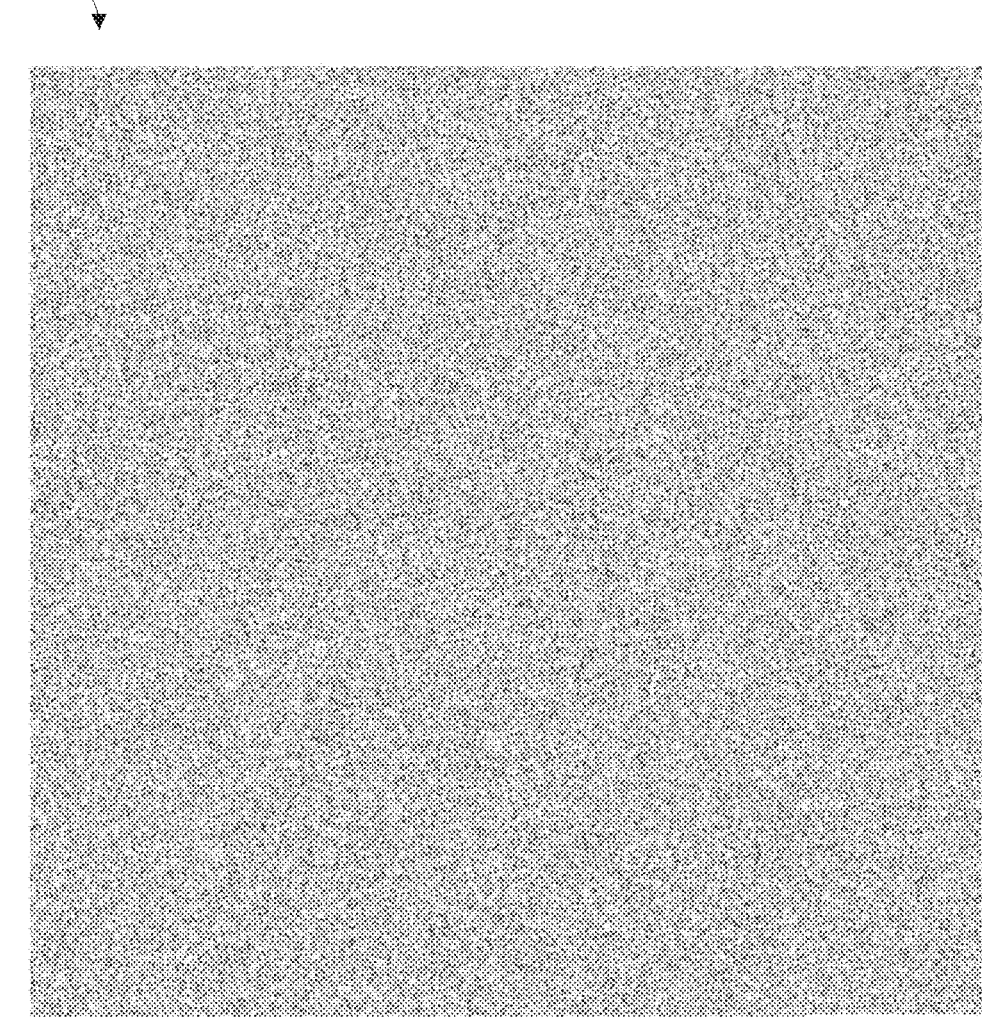
FIG. 3 shows abstract color grid which supports techniques for encoding text and data as color grids with metadata for efficient decoding in accordance with various aspects of the present disclosure.

FIG. 3 shows abstract color grid 300 which supports techniques for encoding text and data as color grids with metadata for efficient decoding in accordance with various aspects of the present disclosure.

The color grid 300 may represent encoded data in an abstract color format that supports efficient storage and retrieval, for a textbook encoded in the RGB color space.

In some implementations, the color grid 300 may be arranged as a compact visual representation of encoded data, where each pixel corresponds to a token or a group of tokens from the original text or structured data. The color grid 300 may operate in conjunction with a dynamically generated dictionary, which maps tokens to specific color values, allowing for deterministic reconstruction of the original data. The dictionary may be appended to the image file as metadata, ensuring that the encoded data can be decoded accurately. The alpha channel in RGBA encoding may be used to differentiate token types, such as instructions, operators, and variables, adding an additional layer of semantic information to the encoded data. The encoded image file may comprise several components, including the pixel grid representing the visual data, the phrase dictionary mapping phrases to colors, and header information containing metadata such as version, language, and settings. The dictionary may be stored in a human-readable format, such as JSON, and may include details about token sequences, spacing, and operator types.

Figures 4, 5:
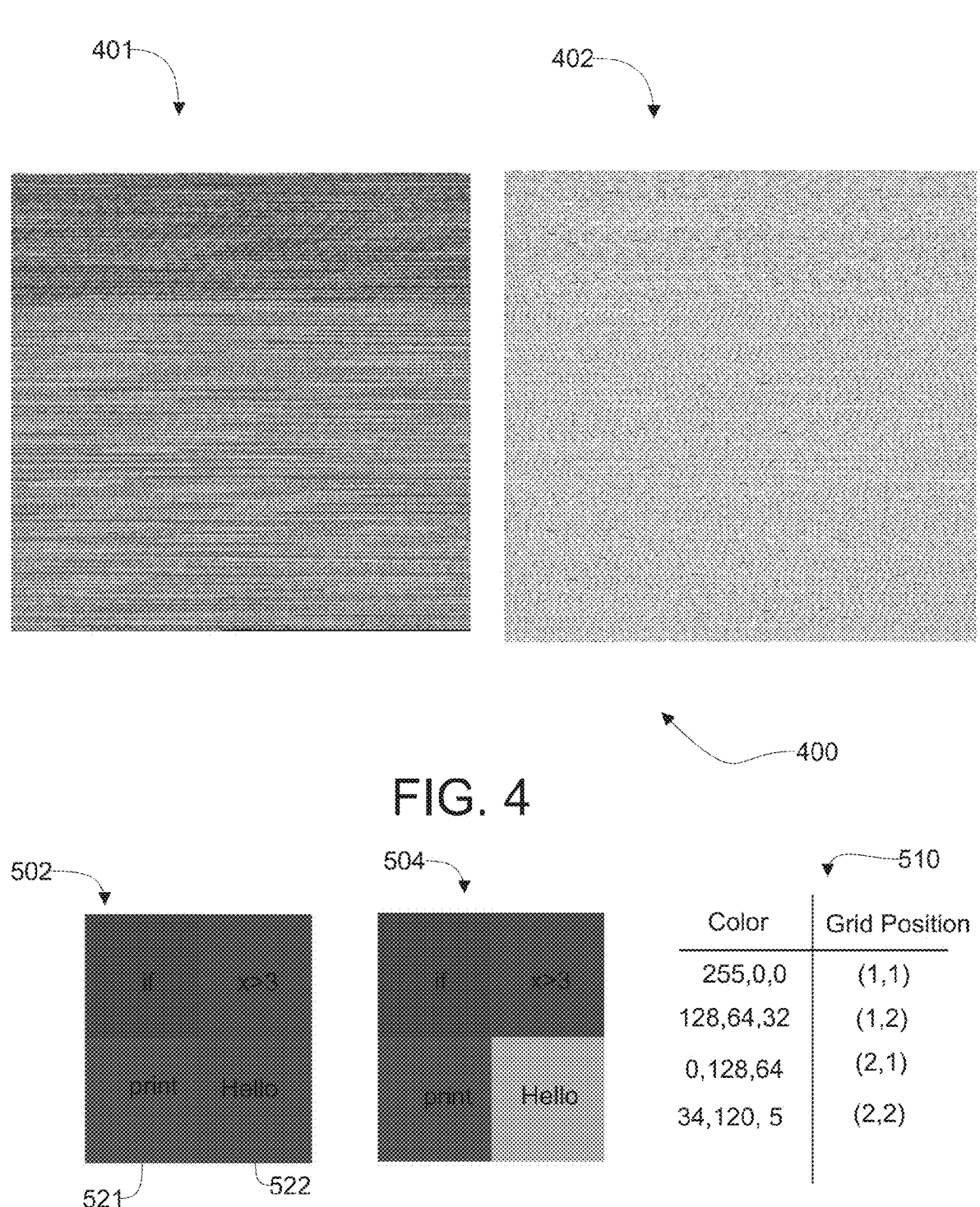
FIG. 4 shows png compression comparison which supports techniques for encoding text and data as color grids with metadata for efficient decoding in accordance with various aspects of the present disclosure.
FIG. 5 shows color-coded grid which supports techniques for encoding text and data as color grids with metadata for efficient decoding in accordance with various aspects of the present disclosure

FIG. 4 shows PNG compression comparison 400 which supports techniques for encoding text and data as color grids with metadata for efficient decoding in accordance with various aspects of the present disclosure.

The first PNG image 401 may represent a program file (source code) encoded in RGB, and the second PNG image 402 may represent the same program file encoded in RGBA where the alpha channel is used to provide a further differentiation about the nature or the function of the coded words or phrases.

In some implementations, the first PNG image 401 may represent a color grid encoding structured data, such as programming code, with each pixel corresponding to a token or phrase mapped to a specific RGB value. The second PNG image 402 may include an extended color grid where the alpha channel is utilized to differentiate token types, such as instructions, operators, or variables, adding semantic layers to the encoded data. The arrangement of first PNG image 401 and second PNG image 402 may involve side-by-side placement, allowing visual comparison of encoding methods, such as RGB versus RGBA, and their respective impacts on data representation. The metadata appended to both images may include dynamically generated dictionaries that map tokens or phrases to their respective color values, ensuring deterministic reconstruction of the original data.

As a non-limiting illustrative encoding example referring to FIG. 5, the text may be:

If x>3;

Print ("Hello")

The text is tokenize in a stream of tokens. For instance, the above text may be tokenized as follows:

Token stream: ["if", "x", ">", "3", ":", "print", "(", "\"Hello\"", ")"] respectively associated with tokens t1, t2, t3, t4, t5, t6, t7, t8, t9.

A lexical analysis of the stream of tokens may attribute some tokens to specific type of information according to a lexicon.

As a non-limiting example, some tokens may correspond to keywords of a programing language, for instance, "if" or "print" in tokens t1 and t6, such atomic tokens may be associated with specific colors in the dictionary.

For instance, in a RGB color space leading to a first exemplary color grid 502. "if" may be associated to (255, 0, 0), i.e. red, while "print" may be associated to (0, 128, 64) i.e. some green.

"if": (255, 0, 0)

"print": (0, 128, 64)

Other tokens are corresponding to operators, identified as such in the programming language lexicon, such as ">" like token t3

Other tokens such as t2 may be assigned to a variable such as: "x"

Such a variable may be assigned to a specific color like. (120, 42, 99), a dark pink.

An operator is always part of a phrase with a left term such as variable "x" and a right term such as the integer 3 in the example of "x>3".

Hence, tokens t2, t3, t4 may form a phrase which is a common pattern in programming. During encoding, such a phrase may be detected and assigned a specific color value e.g. (128, 64, 32), a dark orange, which will be associated to ["x", ">", "3"] in the dictionary, the dictionary being created at the time of the encoding.

Finally "\" Hello "\" is a string which may be assigned a color like (34, 120, 5), a dark brown, in the dictionary.

Therefore, the instructions translate in:

(255, 0, 0) (128, 64.32) (0, 128.64) (34, 120, 5) which may be represented in 2×2 first exemplary color grid 502. Such a color grid may also be represented as a table 510 associating color squares/pixels to a color square/pixel location in the color grid as (line, column).

As shown in the first exemplary color grid 502 some color of a color square 521 may be visually close to the color of another color square 522.

In order to avoid any confusion between the two colors, more specifically when a later acquisition of the color grid is performed by an optical scanner or a photograph, a collision check may be implemented in the encoder 210, where the selection of any color assigned to a token or a phrase is remote enough from any already assigned color.

In a non-limiting example, a distance between two colors (R1, G1, B1) and (R2, B2, G2) may be computed as:

$$(\|R2-R1\|+\|G2-G1\|+\|B2-B1\|)>N$$

Where N is a threshold. In a second exemplary color grid 504 the color of the color square/pixel at grid position (2,2) is set to (133, 230, 5) with N=199, thus providing a better separation of the colors in the second exemplary color grid 504.

Other color measuring distances may be used for this purpose such as "Redmeans".

Figure 6:
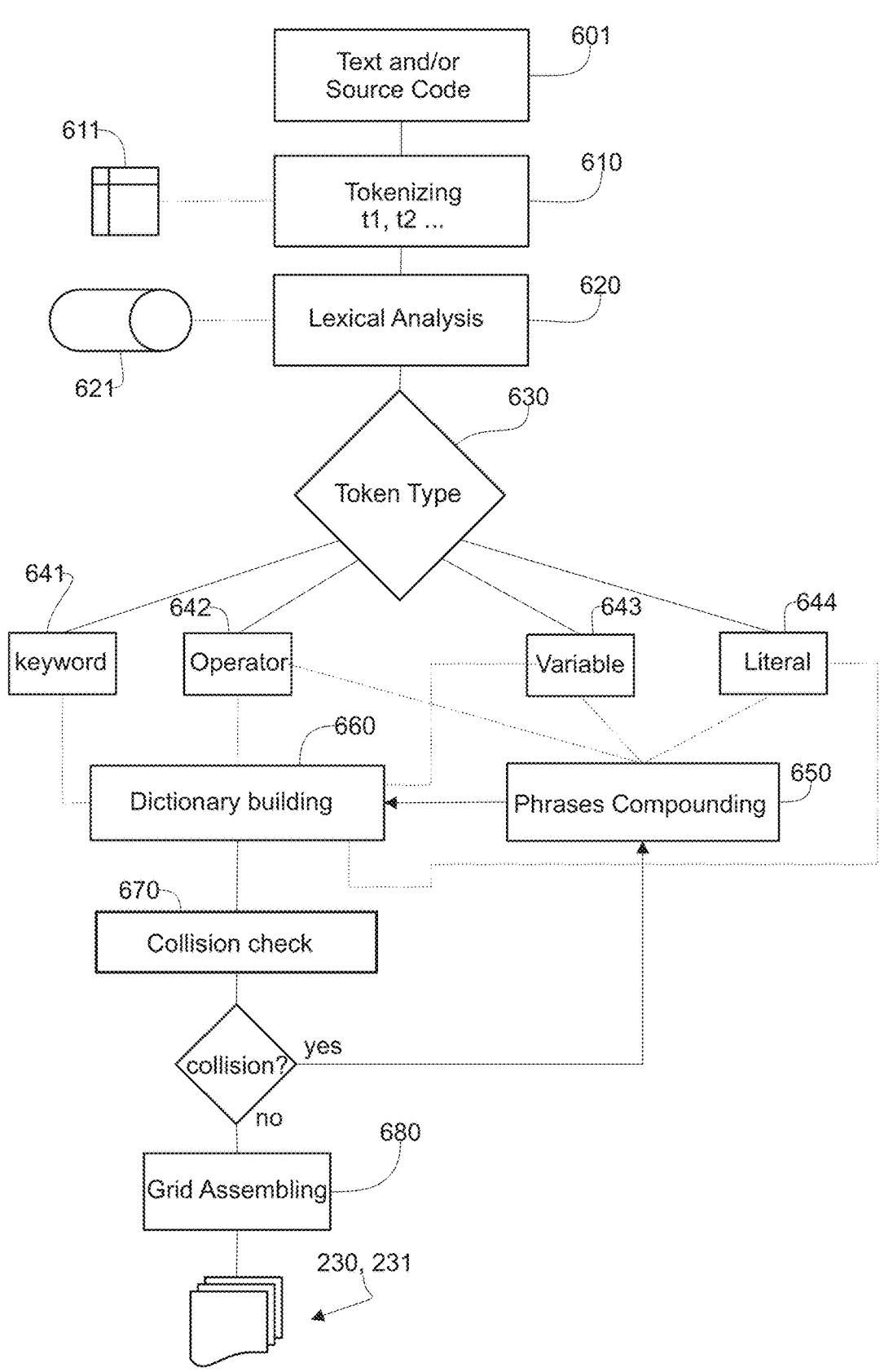
FIG. 6 illustrates a programming color encoding that supports techniques for encoding text and data as color grids with metadata for efficient decoding in accordance with various aspects of the present disclosure.

FIG. 6 illustrates a programming color encoding 600 that supports techniques for encoding text and data as color grids with metadata for efficient decoding in accordance with various aspects of the present disclosure. Operations illustrated in the programming color encoding 600 may involve a text 201, a dictionary 220, an encoder 210, which may be examples of corresponding devices described herein. The programming color encoding 600 may describe a process for converting a text that may comprise a source code 601 into tokenized elements, assigning color values based on token types, and encoding the data into a compact and retrievable format.

The text 201 may include a source code 601 that serves as the input for the encoding process. The source code 601 may contain various programming constructs such as loops, conditionals, and function calls. In some implementations, the text 201 may be stored in a standard text file format.

In a tokenizing step 610, the encoder 210 may break down the text comprising a source code 601 and generate a token stream comprising tokens t1, t2, . . . , tn. The token stream may be stored in a table 611 in a sequential data structure for further processing.

In a lexical analyzing step 620 the encoder 210 may perform lexical analysis of the table 611 to determine the structure and components of the text 201 comprising a source code 601. The tokens may comprise only literal words like in a book, and may comprise instructions in a programming language. In some implementations, the encoder 210 may may use a lexicon 621 to perform the lexical analysis, such lexicon may contain information about one or more programming languages. The lexical analysis may thus identify keywords, operators, and variables in the source code during the lexical analysis. The encoder 210 may utilize a predefined set of rules to parse the text 201. In some implementations, the encoder 210 may handle different programming languages by adjusting its lexical analysis rules.

In a classifying step 630 the encoder 210 may determine the type of each token in the token stream to classify them into predefined categories. In some implementations, the encoder 210 may use a classification algorithm to assign each token to a category. The predefined categories may include keywords, operators, variables, and literals. In some implementations, the classification may be based on a lookup table or a set of rules.

Once tokenized, keywords are called atomic tokens. Throughout the entire color grid, each atomic token is always coded with the same color code and may not be compounded in phrases. Operators may be compounded however they may be coded in a distinctive way.

As a non-limiting example an operator such as ">" may always have a certain value in a certain color channel, for instance 64 in the green channel. Even when compounded in a phrase this value 64 will be kept in the green channel to identify a phrase involving such an operator.

When using an RGBA encoding, atomic tokens, operators and variables may be individually identified by a specific value in the alpha channel. As a non-limiting example, alpha channel values ranging from 0 to 63 may be used for bossy keywords like "if", "for", "while", alpha channel values ranging from 64-127 may be used for action keywords such as "print", alpha channel values ranging from 128 to 191 may be used for operators, and alpha channel values ranging from 192 to 255 may be used for special keywords like "import", "function". These are just illustrative and non-limiting examples.

For each token of the token stream the encoder lookup the tokens that where already assigned a color and if a same token has already been assigned a color, the same color is used.

Variables 643 and literals 644 are assigned color codes on a hash-based RGB or RBGA.

In a compounding step 650 phrases comprising operators, variables and literals may be compounded and assigned a single RGB/RGBA code. For instance, "x>3" is a phrase that may be encoded in a single RGB/RGBA code while preserving the information that it involves an operator, for example by keeping the assigned operator code in the alpha channel. Color algebra may be used at the compounding step 650 to assign color to phrases that are remote enough from already assigned colors.

Various compounding methods may be implemented alone or in combination. According to some implementation when the stream of tokens comprises operators the left term, the right term and the operator are compounded in a phrase. The color value may be assigned according to some rule configured for this type of compounding. As a non-limiting example, in an RGBA encoding, the R, G, B components may be assigned randomly while the value in A is kept to the initial value assigned to this operator. In an RGB encoding the operator type may be coded by a specific color value in one of the RGB channels, therefore the remaining two channels may be coded randomly. In some other implementation in RGBA encoding, the value corresponding to the operator in the alpha channel is kept while the RGB colors corresponding to the right term, the operator and the left term are blended.

For literals, according to some implementation, the token stream may be looked up to detect repetitive patterns of two immediately successive words. If such a repetitive pattern of two words appears at least twice in the token stream the two words are compounded and assigned to a specific color either randomly selected or by blending the color values initially assigned to each of the two words. The compounded two words are then considered as a single token. The look up of the token stream is repeated until there is no more pair of information/token that are present more than once.

As an illustrative and non limiting example, assuming that the following succession of token is repeated more than once in a text: "Lorem ipsum dolor sit amet":

A first parsing may perform a compounding of "Lorem" and "ipsum" assigning a single color in the color space to this group of words. Upon a second look up, "Lorem ipsum" and "dolor" may be compounded together and a single color assigned to this new group of words in the color space. In a third look up "Lorem ipsum dolor" may be compounded with "sit" and a color value assigned in the color space to "Lorem ipsum dolor sit". During a fourth look up "Lorem ipsum dolor sit" may be compounded with "amet" with a single color assigned in the color space the whole phrase "Lorem ipsum dolor sit amet". The tokens "Lorem", "ipsum", "dolor", "sit" and "amet" remain in the dictionary coded as individual tokens.

In a dictionary building step 660, the dictionary 220 is built and may include the predefined RGB values for atomic tokens, operators, variables, literal and compounded phrases identified during the classifying step 630 and built during the compounding step 650.

In a collision check step 670 the dictionary may be analyzed for detecting potential confusions between assigned color codes as well as redundancies like a same phrase coded more than one time. If such collisions are detected, collision defects may be signaled to the phrase encoding component 120 and the phrase compounding step 650 is iterated as well as the dictionary building step 660 until the collisions are fixed.

If there is no collision in the dictionary, the color grid is assembled in a grid assembling step 680, using the dictionary 220, assigning to each token or group of tokens detected in the text 201 comprising the source code 601, a color and a position in the color grid according to a sequence of appearance in the text 201.

Once the color grid is built, it may be saved as an image file 230 with the compressed dictionary appended to it as metadata 231.

FIG. 7 the color grid 230 comprises a plurality of squares/pixels organized in a matrix where the position of each square/pixel in the grid may be spotted by (line, column) coordinates, for instance, ranging from (1,1) on the top left corner to (n, m) on the bottom right corner for a n×m matrix.

During the color grid assembling step 680, each token or compounded phrase of the text 201 may be assigned a position in the color grid, in sequence, according to conventional reading of the text, e.g. from left to right and top to bottom, starting from (1,1) and filling the columns of a line, line by line in the color grid.

When decoding, the image file, the color grid is acquired all at once, each color square/pixel is assigned a text according to the appended dictionary 131 and the whole text is recreated according to the matrix position of the color square/pixel in the color grid 130.

In some embodiment, the allocation of a position in the grid of a color square/pixel may follow different rules. These rules may be complex though deterministic, like strolling between various matrix positions in the grid. Such rules are called reading rules because they are required for decoding the image file, but the person skilled in the art understands that the same rules may be used to assemble the color grid.

When simple enough, the reading rule may be written as instructions in a header of the dictionary 220 that is appended to the image file as metadata 131.

A more complex reading rule may be a specific program that may be integrated at specific positions in one or more parts 721 of the color grid. In the non-limiting example of FIG. 7 the program corresponding to the reading rule is encoded as color squares/pixels in a part of the first line of the matrix. The instruction comprised in the reading rule may be coded from a reading program, the same way as the remainder of the text by assigning color values to atomic tokens and compounding phrases.

The positions where to find the reading rule in the color grid 130 may be indicated in a header of the dictionary. Upon decoding, the one or more parts 721 of the color grid may be decoded as a sub-program defining the reading sequence of the remainder of the color grid.

A complex reading rule may be a way to obfuscate the information comprised in the color grid. In some embodiment, it may also be used to group the color squares/pixel in a way that the color grid represents a recognizable image or artwork.

In some embodiment the text or structure data to be encoded may comprise a plurality of files 701, 702, 703. This may be the case of a program calling subprograms or in a smart contract comprising written clauses and some executable code.

Each of these files may be encoded and be assigned a specific location or area 711, 712, 713, in the color grid 230. A reading rule defined either in the dictionary, in a part of the matrix 721 or combination thereof, may define the locations or areas of corresponding color squares/pixels in the color grid 230.

Figure 8:
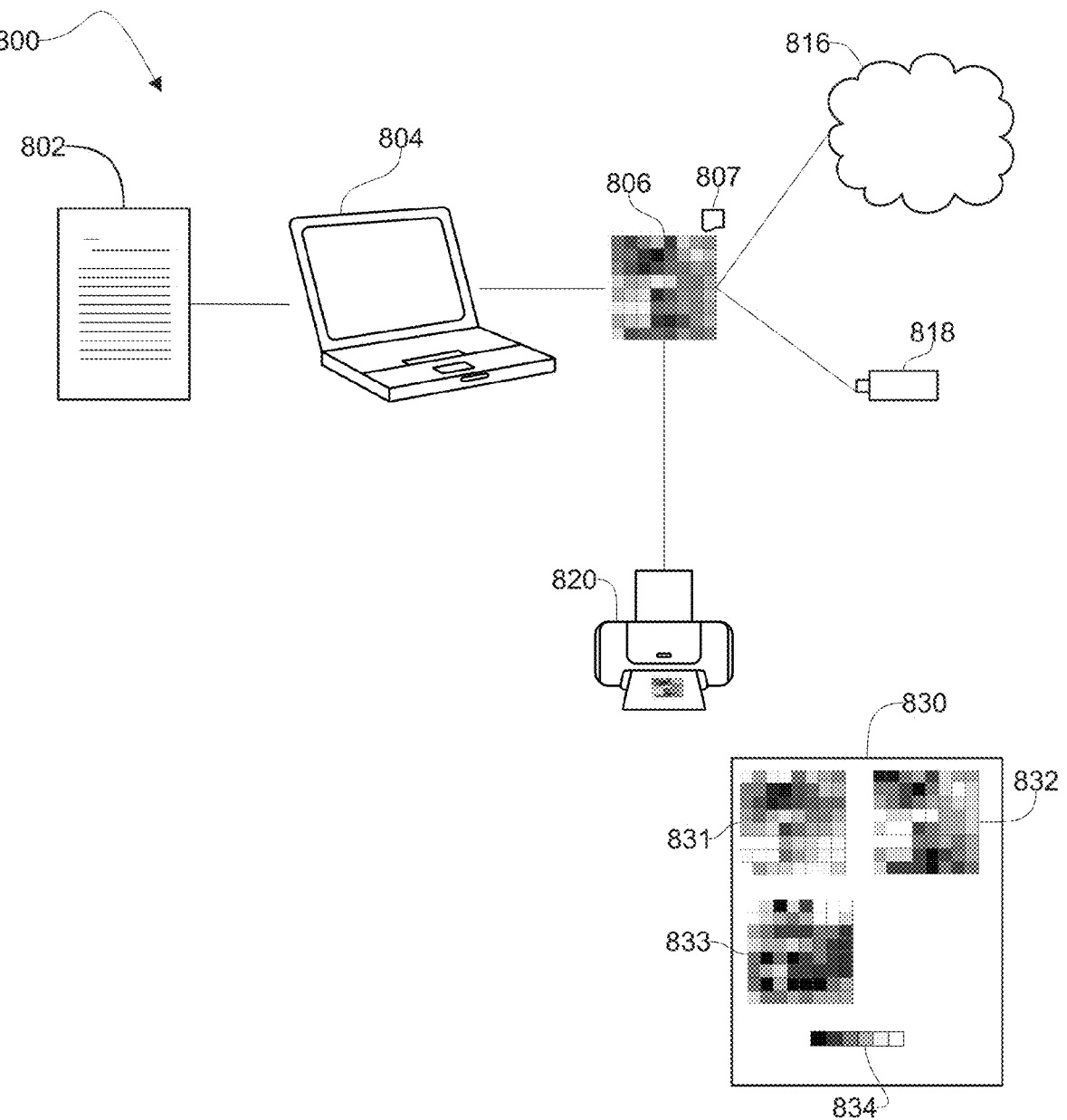
FIG. 8 shows data transmission diagram which supports techniques for encoding text and data as color grids with metadata for efficient decoding in accordance with various aspects of the present disclosure.

FIG. 8 shows data transmission diagram 800 which supports techniques for encoding text and data as color grids with metadata for efficient decoding in accordance with various aspects of the present disclosure. As depicted in FIG. 8, the data transmission diagram 800 may include one or more of a text file 802, a computer 804, with a connection to internet 816, storage device 818, a printer 820, and/or other components.

The text file 802 may represent a source of information to be encoded into a color grid format. The text file 802 may contain various types of data, such as text or programming code, that may be transformed into a visual representation. The encoding process may involve converting the text data into a series of colors, which may be organized into a grid pattern. The text file 802 may be used in conjunction with a computer 804 to facilitate the encoding process.

The computer 804 may include hardware and software capable of encoding text and data into color grids with metadata. The computer 804 may perform lexical analysis and tokenization of the text data to prepare it for encoding. The computer 804 may utilize an encoder to convert the text into a color grid format, associating each word or phrase with a specific color. The computer 804 may create an image 806 comprising a color grid to store the encoded data. In some implementations, the computer 804 may be a personal computer, a server, or a specialized encoding device.

The image 806 may represent a visual representation of encoded text and data in a color grid format. The image 806 may be created by the computer 804 and may include a grid of colored squares/pixels, each representing a word or phrase from the original text. The image 806 may be stored in a digital format, such as a PNG file, and may include metadata 807 that contains a dictionary for decoding the color grid. The image 806, comprising the metadata 807 may be transmitted over the internet 816 or stored on a storage device 818. In some implementations, the image 806 may be printed on paper for physical storage or transmission.

In some implementation the image 806 and the metadata 807 may be sent transmitted separately and over different channels. For instance, the image 806 comprising the color grid may be uploaded through the internet to cloud while a file comprising the metadata 807 may be sent to a recipient as an email attachment. Since the decoding of the image can only be performed with the dictionary, only the recipient may perform the decoding.

In some other implementation the image may be printed on one or more sheets of paper 830 or on a photographic film or microfilm, and the corresponding dictionary may be stored on a storage device 818 such as a USB key, a floppy disc a CDROM or any other suitable means. The dictionary may also be transmitted via the internet, for instance as an email attachment or uploaded to a cloud. When the content of the dictionary is human readable, such as in a JSON file, it may also be printed on paper and transmitted as such.

The image being printed on one or more sheets of paper 830, it may be converted to an electronic format for decoding. To this end, the printed color grid may be optically scanned or digitally photographed. The file image file comprising the color grid may be accurate enough for performing the decoding.

In order to improve the color accuracy of this digitization, the image 806 may be printed not as a color grid but as three, four or more grayscale grids, each of them corresponding to a channel of the color space like: Red, Green, Blue and Alpha in the original image 806.

The red channel 831 may include grayscale data corresponding to the red component of the encoded color grid. The green channel 832 may include grayscale data corresponding to the green component of the encoded color grid. The blue channel 833 may include grayscale data corresponding to the blue component of the encoded color grid An additional grayscale grid (not shown) may comprise the alpha channel data of the color grid. The channel separation may be performed at a printing stage, or, the corresponding grayscale grids may be created in addition to the color grid upon the grid assembling step. Each square of the grid comprises a shade of gray that me be coded over 8 bits.

Once digitized the grayscale grid corresponding to the red channel 831 may be used in conjunction with the grayscale grid corresponding to the green channel 832, the gray scale grid corresponding to the blue channel 833 and the gray scale grid corresponding to the alpha channel to reconstruct the full color grid. In some implementations, the one or more printed sheets of paper 830 may comprise a calibration grayscale 834.

The internet 816 may represent a medium for transmitting encoded color grid images and associated metadata. The internet 816 may facilitate the sharing of encoded images between different devices or users. The internet 816 may be used to send the image 806 and its metadata 807 to a recipient who can decode the color grid. The internet 816 may support various protocols and services to ensure secure and efficient transmission. In some implementations, the internet 816 may be used to distribute encoded images as part of a larger data-sharing network.

The storage device 818 may include a repository for saving encoded color grid images and metadata files. The storage device 818 may be a physical or cloud-based system that stores the image 806 and its associated dictionary in metadata 807. The storage device 818 may ensure that the encoded data is preserved for future access and decoding. The storage device 818 may be accessed by the computer 804 or other devices to retrieve the encoded images. In some implementations, the storage device 818 may include backup and recovery features to protect the stored data.

The printer 820 may include functionality to produce physical copies of encoded color grid images for optical scanning or photography. The printer 820 may be used to create a hard copy of the image 806, allowing it to be shared or stored in a physical format. The printer 820 may ensure that the colors in the grid are accurately reproduced on paper. The printer 820 may work in conjunction with the grayscale 814 to calibrate the printed image for scanning. In some implementations, the printer 820 may support high-resolution printing to maintain the integrity of the color grid.

Figure 9:
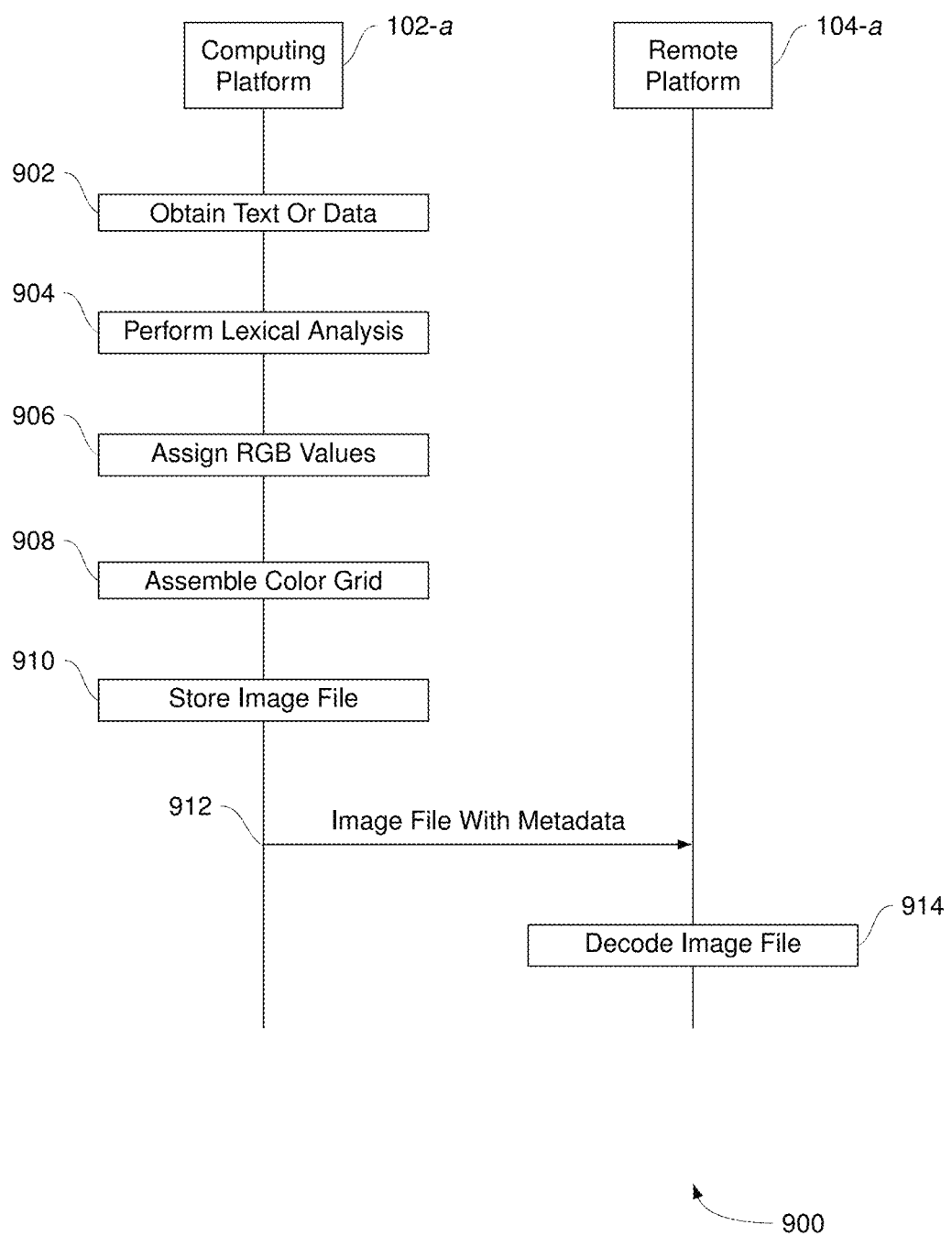
FIG. 9 illustrates an example of a process flow for encoding text and data as color grids with metadata for efficient decoding in accordance with various aspects of the present disclosure.

FIG. 9 illustrates an example of a process flow 900 for encoding text and data as color grids with metadata for efficient decoding in accordance with aspects of the present disclosure. In some examples, the process flow 900 may implement aspects of the system 100. For example, the process flow 900 may include a computing platform 102-*a* (e.g., a server) and a remote platform 104-*a* (e.g., a user device), which may be examples of corresponding devices described herein. In some implementations, a computing platform 102-*a* (e.g., a server) encodes text or structured data into color grids with metadata by tokenizing the data, assigning RGB or RGBA values based on a dynamically generated dictionary, assembling the values into a grid format with metadata, and storing the grid as an image file, which is then transmitted to a remote platform 104-*a* (e.g., a user device) for deterministic decoding.

At 902, the computing platform 102-*a* (e.g., a server) may obtain text or structured data for processing. For example, the computing platform 102-*a* may retrieve text from a database containing legal agreements or programming instructions. In some implementations, the computing platform 102-*a* may access structured data such as JSON files or XML documents. The computing platform 102-*a* may extract specific tokens or phrases from the obtained text or structured data to prepare for subsequent analysis or encoding.

At 904, the computing platform 102-*a* (e.g., a server) may perform lexical analysis to tokenize the obtained text or structured data into atomic tokens and compounded phrases. For example, the computing platform 102-*a* may identify keywords such as "if" or "print" and assign them specific token identifiers for subsequent processing. In some implementations, the computing platform 102-*a* may detect operators like ">" or ":" and group them with adjacent tokens to form logical phrases for encoding. The computing platform 102-*a* may analyze text strings, such as "Hello", and assign them unique token values based on their context within the obtained text or structured data.

At 906, the computing platform 102-*a* (e.g., a server) may assign distinct RGB or RGBA values to the atomic tokens and compounded phrases based on a dynamically generated dictionary, the dictionary mapping tokens and phrases to corresponding color values. For example, the computing platform 102-*a* may assign the RGB value (255, 0, 0) to the keyword "if" and the RGBA value (0, 128, 64, 64) to the keyword "print" to differentiate instructions within the encoded data. In some implementations, the computing platform 102-*a* may assign a unique RGB value to a compounded phrase such as ["x", ">", "3"], ensuring that the phrase is represented as a single color in the dynamically generated dictionary. In some implementations, the computing platform 102-*a* may perform a collision check to ensure that assigned colors are sufficiently distinct from one another to avoid confusion during decoding.

At 908, the computing platform 102-*a* (e.g., a server) may assemble a color grid by placing the assigned RGB or RGBA values into a grid format according to predefined reading rules, the grid including metadata comprising the dynamically generated dictionary. For example, the computing platform 102-*a* may arrange the color grid in a row-by-column structure where each pixel corresponds to a specific token or phrase, ensuring the grid format aligns with the reading rules specified in the metadata. In some implementations, the computing platform 102-*a* may include additional markers or beacons within the grid to denote boundaries between sections of encoded data, such as separating keywords from compounded phrases. In some implementations, the computing platform 102-*a* may adjust the grid dimensions dynamically based on the volume of tokens or phrases being encoded, allowing for flexible representation of varying text sizes.

At 910, the computing platform 102-*a* (e.g., a server) may store the assembled color grid as an image file with metadata appended for deterministic decoding of text or structured data. For example, the computing platform 102-*a* may save the image file in a PNG format, where the metadata may include a dynamically generated dictionary mapping RGB or RGBA values to corresponding tokens or phrases. In some implementations, the computing platform 102-*a* may append metadata in a JSON format to the image file, allowing the dictionary to be human-readable and compatible with decoding processes. In some implementations, the computing platform 102-*a* may store the image file with additional markers embedded in the metadata to denote specific reading rules or grid alignment parameters.

At 912, the computing platform 102-*a* (e.g., a server) may transmit the stored image file with metadata to the remote platform 104-*a* (e.g., a user device). For example, the computing platform 102-*a* may send the image file as an email attachment to the remote platform 104-*a*, where the metadata may be embedded within the file for decoding. In some implementations, the computing platform 102-*a* may transmit the image file through a secure file transfer protocol, ensuring that the metadata remains intact during transmission. In some implementation, the computing platform 102-*a* may send the image file to the remote platform 104-*a* via a cloud-based storage service, where the remote platform 104-*a* may access and download the file for further processing.

At 914, the remote platform 104-*a* (e.g., a user device) may decode the transmitted image file using the appended metadata to reconstruct the original text or structured data. For example, the remote platform 104-*a* may extract the dictionary from the metadata and determine the corresponding tokens or phrases for each pixel in the image file based on the RGB or RGBA values. In some implementations, the remote platform 104-*a* may process the image file in its entirety to determine the sequence of tokens or phrases according to the reading rules specified in the metadata. In some implementations, the remote platform 104-*a* may utilize the metadata to determine spacing or formatting details, such as whitespace or token boundaries, to accurately reconstruct the original text or structured data.

Figure 10:
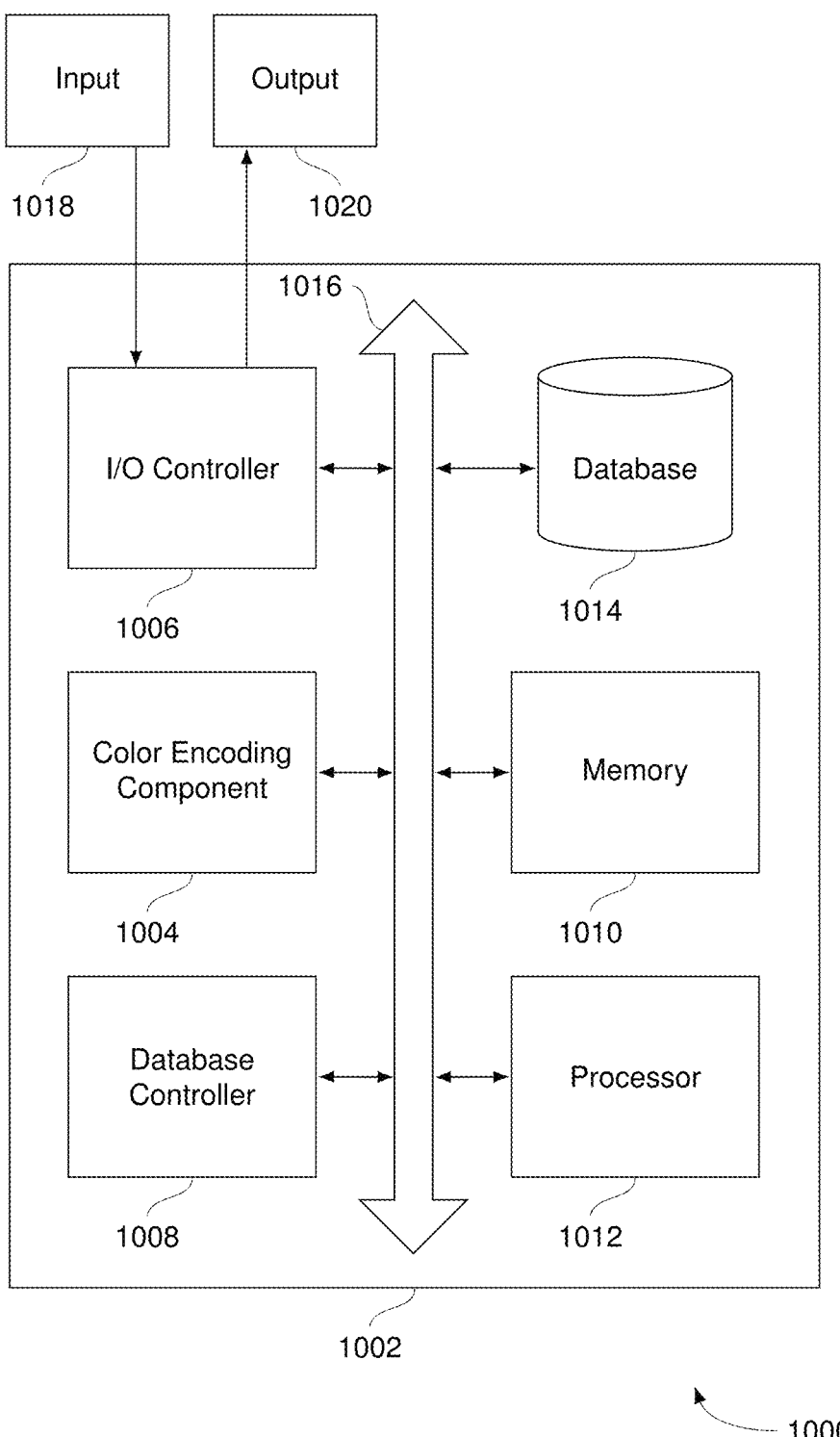
FIG. 10 shows a diagram of a system including a device for encoding text and data as color grids with metadata for efficient decoding in accordance with various aspects of the present disclosure.

FIG. 10 shows a diagram of a system 1000 including a device 1002 configured for encoding text and data as color grids with metadata for efficient decoding in accordance with aspects of the present disclosure. The device 1002 may be an example of or include the components of a computing platform 102 and a remote platform 104 as described herein. The device 1002 may include components for bi-directional data communications including components for transmitting and receiving communications, including a color encoding component 1004, an I/O controller 1006, a database controller 1008, memory 1010, a processor 1012, and a database 1014. These components may be in electronic communication via one or more buses (e.g., bus 1016).

The color encoding component 1004 may be an example of one or more components of the system 100 as described herein. For example, the color encoding component 1004 may perform any of the methods or processes described above with reference to machine-readable instructions 106 in connection with FIG. 1. In some cases, the color encoding component 1004 may be implemented in hardware, software executed by a processor, firmware, or any combination thereof.

The I/O controller 1006 may manage input signals 1018 and output signals 10126 for the device 1002. The I/O controller 1006 may also manage peripherals not integrated into the device 1002. In some cases, the I/O controller 1006 may represent a physical connection or port to an external peripheral. In some cases, the I/O controller 1006 may utilize an operating system such as iOS®, ANDROID®, MS-DOS®, MS-WINDOWS®, OS/2®, UNIX®, LINUX®, or another known operating system. In other cases, the I/O controller 1006 may represent or interact with a modem, a keyboard, a mouse, a touchscreen, or a similar device. In some cases, the I/O controller 1006 may be implemented as part of a processor. In some cases, a user may interact with the device 1002 via the I/O controller 1006 or via hardware components controlled by the I/O controller 1006.

The database controller 1008 may manage data storage and processing in a database 1014. In some cases, a user may interact with the database controller 1008. In other cases, the database controller 1008 may operate automatically without user interaction. The database 1014 may be an example of a single database, a distributed database, multiple distributed databases, a data store, a data lake, or an emergency backup database.

Memory 1010 may include random-access memory (RAM) and read-only memory (ROM). The memory 1010 may store computer-readable, computer-executable software including instructions that, when executed, cause the processor to perform various functions described herein. In some cases, the memory 1010 may contain, among other things, a basic input/output system (BIOS) which may control basic hardware or software operation such as the interaction with peripheral components or devices.

The processor 1012 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1012 may be configured to operate a memory array using a memory controller. In other cases, a memory controller may be integrated into the processor 1012. The processor 1012 may be configured to execute computer-readable instructions stored in a memory 1010 to perform various functions (e.g., functions or tasks for encoding text and data as color grids with metadata for efficient decoding).

FIG. 11 shows a flowchart illustrating a method 1100 for encoding text and data as color grids with metadata for efficient decoding in accordance with various aspects of the present disclosure. The operations of the method 1100 may be implemented by one or more components of a networked computing system as described herein. For example, the operations of the method 1100 may be performed by color encoding component 1004 or through execution of machine-readable instructions 106 as described with reference to FIG. 10 and FIG. 1, respectively. In some examples, one or more components of a networked computing system may execute a set of instructions to control the functional elements of the component(s) to perform the described functions. Additionally, or alternatively, the one or more components of a networked computing system may perform aspects of the described functions using special-purpose hardware.

At 1102, the method 1100 may include receiving text or structured data at a server and performing lexical analysis to tokenize the data into atomic tokens and compounded phrases. The operations of 1102 may be performed in accordance with examples as disclosed herein. In some examples, aspects of the operations of 1102 may be performed by a lexical analysis component 108 as described with reference to FIG. 1.

At 1104, the method 1100 may include assigning distinct RGB or RGBA values to atomic tokens and compounded phrases based on a dynamically generated dictionary, the dictionary mapping tokens and phrases to corresponding color values. The operations of 1104 may be performed in accordance with examples as disclosed herein. In some examples, aspects of the operations of 1104 may be performed by a color assignment component 110 as described with reference to FIG. 1.

At 1106, the method 1100 may include assembling a color grid by placing assigned RGB or RGBA values into a grid format according to predefined reading rules, as well as metadata comprising the dynamically generated dictionary. The operations of 1106 may be performed in accordance with examples as disclosed herein. In some examples, aspects of the operations of 1106 may be performed by a grid assembly component 112 as described with reference to FIG. 1.

At 1108, the method 1100 may include storing the color grid as an image file with metadata appended for deterministic decoding of text or structured data. The operations of 1108 may be performed in accordance with examples as disclosed herein. In some examples, aspects of the operations of 1108 may be performed by an image storage component 114 as described with reference to FIG. 1.

FIG. 12 shows a flowchart illustrating a method 1200 for encoding text and data as color grids with metadata for efficient decoding in accordance with various aspects of the present disclosure. The operations of the method 1200 may be implemented by one or more components of a networked computing system as described herein. For example, the operations of the method 1200 may be performed by color encoding component 1004 or through execution of machine-readable instructions 106 as described with reference to FIG. 10 and FIG. 1, respectively. In some examples, one or more components of a networked computing system may execute a set of instructions to control the functional elements of the component(s) to perform the described functions. Additionally, or alternatively, the one or more components of a networked computing system may perform aspects of the described functions using special-purpose hardware.

At 1202, the method 1200 may include receiving, at a user device, an image file containing a color grid and appended metadata, the metadata including a dynamically generated dictionary mapping RGB or RGBA values to corresponding atomic tokens and compounded phrases. The operations of 1202 may be performed in accordance with examples as disclosed herein. In some examples, aspects of the operations of 1202 may be performed by an image storage component 114 as described with reference to FIG. 1.

At 1204, the method 1200 may include extracting the metadata from the image file and performing deterministic decoding of the color grid by reconstructing text or structured data based on the dynamically generated dictionary and predefined reading rules.

At 1206, the method 1200 may include interpreting the reconstructed text or structured data by processing atomic tokens and compounded phrases according to their assigned RGB or RGBA values.

At 1208, the method 1200 may include outputting the reconstructed text or structured data in a human-readable or machine-executable format. The operations of 1208 may be performed in accordance with examples as disclosed herein.
I
It should be noted that the methods described herein describe possible implementations, and that the operations and the steps may be rearranged or otherwise modified and that other implementations are possible. Furthermore, aspects from two or more of the methods may be combined.

EXAMPLES

FIG. 13 shows examples of data compression achievable with RGB and RGBA based encoding compared with the results obtained with a common compression software like WinRar®.

Bible.txt is an ASCII file of "King James Bible Pure Cambridge Edition" comprising more than 700,000 words and 12,000 different words. The ASCII file is 4,350 KB which may be compressed to 1,366 KB using common compression software. When encoded in a RGB color grid 300 and saved as a PNG file with appended metadata, the size of the PNG file is 1,337 KB. When encoded using a RGBA color grid the size of the resulting PNG file is also 1,337 KB. After encoding-decoding or compression decompression the resulting file may be compared to the original file using a word processor comparing function.

Program1.py is a source code in Python® programming language. The source code comprises 214,419 lines and 52,446,747 characters, for a size of 51,218 KB. The program displays a simple animation making it easy after coding-decoding or compression-decompression to check out if the executed program is error free. When compressed using common compression software, the size is reduced to 1,034 KB. When encoded in a RGB color grid 401 and saved as a PNG file with appended metadata, the size of the PNG file is 86 KB which is more than 500 times reduction compared to the original file. When encoded in a RGBA color grid 402 and saved as a PNG file with appended metadata, the size of the PNG file is 146 KB. After encoding-decoding or compression decompression the resulting source code may be executed to check out the accuracy of the process.

In any of these examples the compression-decompression and the encoding-decoding whether based of RGB or RGBA coding are error free.

Common compression software relies on CPU resources for performing the compression-decompression process. With the coding-decoding of color grids the encoding-decoding process relies, at least partly, on GPU resources. GPU excels at processing image files. The encoding-decoding of an image comprising a color grid is at least as quick as the compression-decompression process, both in the range of 200 ms.

FIG. 14 shows some exemplary average size breakdown of an image file comprising a color grid and appended metadata comprising a dictionary, encoding a program source code and created with the method of the disclosure.

The color grid represents about 90% of the image file size.

Dedicated Hardware

Figure 15:
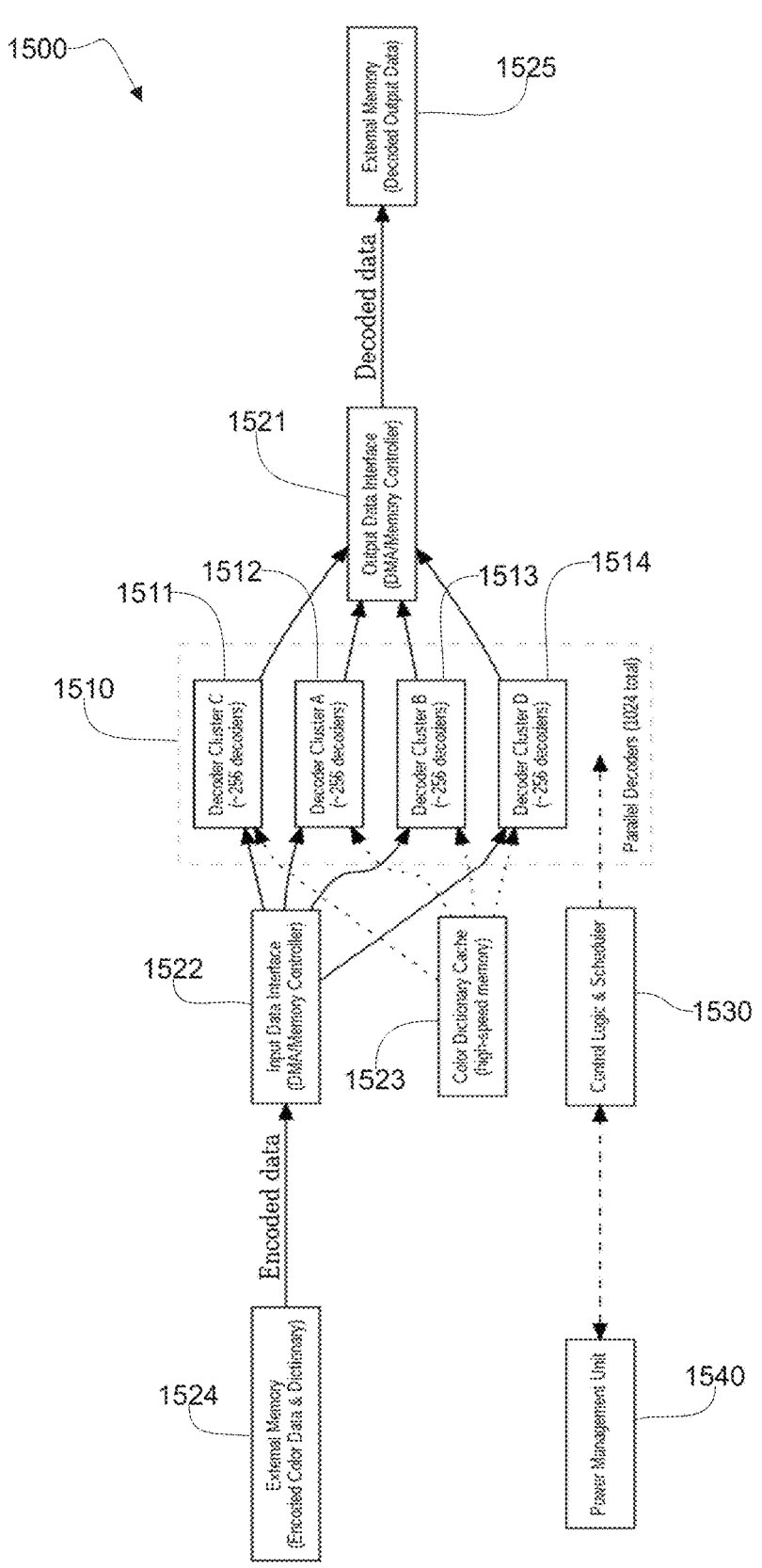
FIG. 15 shows a block diagram of an example of dedicated hardware for decoding an image file with appended metadata obtained in accordance with various aspects of the present disclosure.

FIG. 15 the processing time of encoding and decoding a color grid contained in an image file with appended metadata comprising the dictionary, may be further reduced by using a dedicated graphic card 1500. The dedicated graphic card may be based on a highly parallel architecture, where the workload of encoding and decoding text and data in color grid, is distributed across a set of parallel decoders 1510 which may be grouped into clusters 1511, 1512, 1513, 1514 for manageability and efficiency. For example, the set of parallel decoders 1510 may comprise four clusters of 256 decoders each, for a total of 1024 parallel decoders. Each decoder cluster may be a grouping of decoder cores that may operate in parallel on different portions of a data stream.

The graphic card 1500 may include multiple memory interface modules 1521, 1522, 1523 to handle data input/output at high bandwidth, as well as control logic 1530 that orchestrates the operations of the decoders. A power management unit 1540 may ensure that the decoder array operates efficiently and stays within power and thermal limits.

A custom cache memory 1523 may store the dictionary on board. The custom cache memory 1523 may be a specialized memory subsystem optimized for the pattern of accesses that occur during decoding such as frequent and repeated lookups of small entries ensuring that each decoder may retrieve a color value corresponding to a given atomic token or compounded phrase in the dictionary with minimum latency. The custom cache memory 1523 may be designed with either multiple ports or replication to handle a degree of parallel access.

A file, such as a PNG file, comprising the color grid and the appended metadata may be loaded in an external memory 1524 and the dictionary contained in the metadata may be loaded from the external memory 1524 into the custom cache memory 1523 at initialization or on demand. Once the file is loaded, the decoders of the set of decoders 1510 may repeatedly query the custom memory cache 1523 for translating the colors of color squares/pixels comprised in the color grid.

An input data interface 1522 may read the color grid and an output data interface 1525 writes the decoded output data.

The control logic 1530 may comprise an instruction scheduler component ensuring that decoders are fed with the right instructions or configuration to perform their decoding jobs. In some implementations, the decoders may be configurable or programmable cores that require instruction sequences—in such cases, the instruction scheduler component may dispatch instructions or firmware to the decoders and may schedule their execution to maximize parallel efficiency. In some other implementation, the decoders may be more fixed-function (hardwired logic for a specific decoding algorithm), and the instruction scheduler component role may be to distribute chunks of data to each decoder core, assigning which part of the input stream each decoder cluster will handle, and to coordinating the start/stop of decoding operations across decoder clusters.

The ability to largely reduce a source code size by encoding it in an image comprising a color grid and appended metadata comprising a dictionary, associated with a high speed decoding provided by such an exemplary dedicated hardware, enables to feed a remote platform 104a with large source code instructions in the form of image files with appended metadata from a server 102a, further decoding the image file for executing the program by interpreting or compiling the source code.

Aspects

Aspect 1: A method for encoding text and data as color grids with metadata for efficient decoding, and transmission, comprising: receiving text or structured data and performing tokenizing and lexical analysis of the text or structured data for arranging the text or structured data into a stream of classified tokens comprising atomic tokens and compounded phrases; assigning distinct color values in a color space to atomic tokens and compounded phrases based on a dynamically generated dictionary, the dynamically generated dictionary mapping classified tokens and compounded phrases to corresponding distinct color values; assembling a color grid by placing assigned distinct color values into a grid format according to a predefined reading rule and generating metadata comprising the dynamically generated dictionary; and storing the color grid as an image file with appended metadata comprising the dynamically generated dictionary for deterministic decoding of text or structured data comprising the dynamically generated dictionary; and storing the color grid as an image file with metadata appended for deterministic decoding of text or structured data.

Aspect 2: The method of aspect 1, f wherein the color space is selected among RGB, sRGB and RGBA.

Aspect 3: The method of any aspects 1 through 2, further comprising performing a collision check to ensure that assigned color values for atomic tokens and compounded phrases are sufficiently distinct from one another based on a predefined color distance threshold to prevent decoding errors during reconstruction of the text or structured data.

Aspect 4: The method of any of aspects 1 through 3, further comprising appending metadata to the image file that includes positions in the color grid of color values configured to define the reading rule specifying a positional arrangement of color values within the color grid that when decoded are defining an organized sequence for decoding the color grid.

Aspect 5: The method of any of aspects 1 through 4, fu further comprising encoding compounded phrases by blending color values of individual tokens within the compounded phrases to generate unique color values that are mapped to the dynamically generated dictionary.

Aspect 6: The method of any of aspects 1 through 5, further comprising generating the dynamically generated dictionary in a compressed format that includes mappings of color values to tokens and phrases, as well as metadata specifying language settings and syntax rules for decoding.

Aspect 7: The method of any of aspects 1 through 6, further comprising storing the image file in a format that supports metadata embedding, compatible with electronic transmission.

Aspect 8: The method of any of aspects 1 through 7, further comprising printing the color grid on a physical medium and transmitting the physical medium along with the dynamically generated dictionary.

Aspect 9: The method of aspect 8, wherein the color grid is printed as a plurality of grayscale grid each grayscale grid corresponding to a color channel in the color space.

Aspect 10. The method of any of aspects 1 through 9, wherein the dynamically generated dictionary includes mappings for compounded phrases that are identified in response to detecting repeating patterns within the text or structured data.

Aspect 11: The method of any of aspects 1 through 9, wherein the metadata includes a predefined alpha channel value for RGB or RGBA colors that distinguishes keywords from operators within the text or structured data.

Aspect 11: The method of any aspect 1 through 10, wherein the color space is RGBA and wherein the metadata includes a predefined alpha channel value for RGBA colors that distinguishes keywords and operators within the text or structured data.

Aspect 12: A system configured for encoding and decoding text and data as color grids with metadata for efficient decoding, comprising an encoding platform and a decoding platform comprising at least one means for performing a method of any of aspects 1 through 11.

Aspect 13: The system of aspect 1, wherein the decoding platform comprises a hardware comprising: an input external memory configured for storing the image file with appended metadata comprising the dynamically generated dictionary; a memory cache configured for storing the dynamically generated dictionary; a set of parallel decoders grouped into clusters; a control logic configured to feed the parallel decoders with information from the external memory and the memory cache; and an output external memory configured to store the decoded text or structured data.

Aspect 13: A non-transitory computer-readable medium storing code for encoding text and data as color grids with metadata for efficient decoding, the code comprising instructions executable by a processor to perform a method of any of aspects 1 through 11.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for encoding text and data as color grids with metadata for efficient decoding, and transmission, comprising: receiving text or structured data and performing tokenizing and lexical analysis of the text or structured data for arranging the text or structured data into a stream of classified tokens comprising atomic tokens and compounded phrases; assigning distinct color values in a color space to atomic tokens and compounded phrases based on a dynamically generated dictionary, the dynamically generated dictionary mapping classified tokens and compounded phrases to corresponding distinct color values; assembling a color grid by placing assigned distinct color values into a grid format according to a predefined reading rule and generating metadata comprising the dynamically generated dictionary; and storing the color grid as an image file with appended metadata comprising the dynamically generated dictionary for deterministic decoding of text or structured data; wherein the color space is RGBA and wherein the metadata includes a predefined alpha channel value for RGBA colors that distinguishes atomic tokens comprising keywords and operators within the text or structured data.

2. The method of claim 1, further comprising performing a collision check to ensure that assigned color values for atomic tokens and compounded phrases are sufficiently distinct from one another based on a predefined color distance threshold to prevent decoding errors during reconstruction of the text or structured data.

3. The method of claim 1, further comprising appending metadata to the image file that includes positions in the color grid of color values configured to define the reading rule specifying a positional arrangement of color values within the color grid that when decoded are defining an organized sequence for decoding the color grid.

4. The method of claim 1, further comprising encoding compounded phrases by blending color values of individual tokens within the compounded phrases to generate unique color values that are mapped to the dynamically generated dictionary.

5. The method of claim 1, further comprising generating the dynamically generated dictionary in a compressed format that includes mappings of color values to tokens and phrases, as well as metadata specifying language settings and syntax rules for decoding.

6. The method of claim 1, further comprising storing the image file in a format that supports metadata embedding, compatible with electronic transmission.

7. The method of claim 1, further comprising printing the color grid on a physical medium and transmitting the physical medium along with the dynamically generated dictionary.

8. The method of claim 7, wherein the color grid is printed as a plurality of grayscale grid each grayscale grid corresponding to a color channel in the color space.

9. The method of claim 1, wherein the dynamically generated dictionary includes mappings for compounded phrases that are identified in response to detecting repeating patterns within the text or structured data.

10. A system configured for encoding and decoding text and data as color grids with metadata for efficient decoding, comprising an encoding platform and a decoding platform, the encoding platform comprising: a processor; memory coupled with the processor; and instructions stored in the memory and executable by the processor to cause the system to: receiving text or structured data and performing tokenizing and lexical analysis of the text or structured data for arranging the text or structured data into a stream of classified tokens comprising atomic tokens and compounded phrases; assigning distinct color values in a color space to atomic tokens and compounded phrases based on a dynamically generated dictionary, the dynamically generated dictionary mapping classified tokens and compounded phrases to corresponding distinct color values; assembling a color grid by placing assigned distinct color values into a grid format according to a predefined reading rule and generating metadata comprising the dynamically generated dictionary; and storing the color grid as an image file with appended metadata comprising the dynamically generated dictionary for deterministic decoding of text or structured data; wherein the decoding platform comprises a hardware comprising: an input external memory configured for storing the image file with appended metadata comprising the dynamically generated dictionary; a memory cache configured for storing the dynamically generated dictionary; a set of parallel decoders grouped into clusters; a control logic configured to feed the parallel decoders with information from the external memory and the memory cache; and an output external memory configured to store the decoded text or structured data.

11. The system of claim 10, wherein the instructions are further executable by the processor to cause the system to: perform a collision check to ensure that assigned color values for atomic tokens and compounded phrases are sufficiently distinct from one another based on a predefined color distance threshold to prevent decoding errors during reconstruction of the text or structured data.

12. The system of claim 10, wherein the instructions are further executable by the processor to cause the system to: append metadata to the image file that includes positions in the color grid of color values configured to define the reading rule specifying a positional arrangement of color values within the color grid, that when decoded are defining an organized sequence for decoding the color grid.

13. The system of claim 10, wherein the instructions are further executable by the processor to cause the system to: encode compounded phrases by blending color values to generate unique color values for compounded phrases that are mapped to the dynamically generated dictionary.

14. The system of claim 10, wherein the instructions are further executable by the processor to cause the system to: generate the dynamically generated dictionary in a compressed format that includes mappings of the color values to atomic tokens and compounded phrases, as well as metadata specifying language settings and syntax rules for decoding.

15. The system of claim 10, wherein the instructions are further executable by the processor to cause the system to: store the image file in a format that supports metadata embedding, for electronic transmission to the decoding platform configured to retrieve the encoded text or structured data.

16. The system of claim 10, wherein the text or structured data is a source code of a program and wherein the decoding platform comprises an interpreter for reading the source code from the output external memory and executing the program.

17. A non-transitory computer-readable medium storing code for encoding text and data as color grids with metadata for efficient decoding, the code comprising instructions executable by a processor for: receiving text or structured data and performing tokenizing and lexical analysis of the text or structured data for arranging the text or structured data into a stream of classified tokens comprising atomic tokens and compounded phrases; assigning distinct color values in a color space to atomic tokens and compounded phrases based on a dynamically generated dictionary, the dynamically generated dictionary mapping classified tokens and compounded phrases to corresponding distinct color values; assembling a color grid by placing assigned distinct color values into a grid format according to a predefined reading rule and generating metadata comprising the dynamically generated dictionary; and storing the color grid as an image file with appended metadata comprising the dynamically generated dictionary for deterministic decoding of text or structured data; wherein the color space is RGBA and wherein the metadata includes a predefined alpha channel value for RGBA colors that distinguishes atomic tokens comprising keywords and operators within the text or structured data.

* * * * *